(12) United States Patent
Yao

(10) Patent No.: US 10,632,599 B2
(45) Date of Patent: Apr. 28, 2020

(54) STAPLE ADVANCE DEVICE FOR STAPLER

(71) Applicant: Romp Coil Nail Industries Inc., Chang Hua (TW)

(72) Inventor: Shun Ping Yao, Chang Hua (TW)

(73) Assignees: Romp Coil Nail Industries Inc., Chang Hua (TW); Shun Ping Yao, Chang Hua (TW)

( * ) Notice: Subject to any disclaimer, the term of this patent is extended or adjusted under 35 U.S.C. 154(b) by 361 days.

(21) Appl. No.: 15/701,484

(22) Filed: Sep. 12, 2017

(65) Prior Publication Data

US 2019/0076999 A1    Mar. 14, 2019

(51) Int. Cl.
*B25C 1/00* (2006.01)
*B25B 23/04* (2006.01)
*F16B 27/00* (2006.01)
*B25C 7/00* (2006.01)

(52) U.S. Cl.
CPC ............ *B25C 1/003* (2013.01); *B25B 23/045* (2013.01); *B25C 7/00* (2013.01); *F16B 27/00* (2013.01)

(58) Field of Classification Search
CPC .. B25C 1/003; B25C 1/06; B25C 7/00; B25B 23/045
USPC ......................................................... 227/120
See application file for complete search history.

(56) References Cited

U.S. PATENT DOCUMENTS

| | | |
|---|---|---|
| 5,231,900 A | 8/1993 | Deri |
| 5,337,635 A | 8/1994 | Habermehl |
| 5,469,767 A | 11/1995 | Habermehl |
| 5,568,753 A | 10/1996 | Habermehl et al. |
| 5,699,704 A | 12/1997 | Habermehl |
| 5,826,468 A | 10/1998 | Daubinger et al. |
| 5,870,933 A | 2/1999 | Habermehl et al. |
| 6,123,244 A | 9/2000 | Huang |
| 6,186,385 B1 | 2/2001 | Huang |
| 2,275,429 A1 | 5/2001 | Huang |
| 6,422,447 B1 * | 7/2002 | White ..................... B25C 1/003 227/120 |
| 6,431,430 B1 * | 8/2002 | Jalbert .................... B25C 1/003 227/131 |

* cited by examiner

*Primary Examiner* — Chelsea E Stinson
(74) *Attorney, Agent, or Firm* — Charles E. Baxley

(57) ABSTRACT

A staple advance device includes a receptacle having a guide pathway formed by a low level surface, a high level surface, a tilted surface located between the low and the high level surfaces, and an inclined surface formed and located beside the low level surface and communicating with the low level surface, a barrel is slidably engaged in the receptacle, a guide plate is attached to the barrel for supporting the fasteners, an actuating lever is pivotally attached to the barrel with a pivot axle and includes a guide pin slidably engaged in the guide pathway of the receptacle, and a guide rod for feeding the fastener into the barrel selectively, a guide device includes a gate for engaging with the tilted surface and for forming an endless guide pathway for the receptacle selectively.

7 Claims, 21 Drawing Sheets

STAPLE ADVANCE DEVICE FOR STAPLER

BACKGROUND OF THE INVENTION

1. Field of the Invention

The present invention relates to a staple advance or feeding device or mechanism, and more particularly to a staple advance or feeding device including an improved structure or configuration for effectively advancing or feeding or driving collated staples or screws or nails or fasteners which are joined together in a strip or the like.

2. Description of the Prior Art

Various kinds of typical staple advance or feeding or driving devices for power driving tools or mechanisms, such as staplers, comprise an advancing or feeding or driving mechanism for engaging with and for driving or feeding or advancing collated fasteners, such as screws or nails or staples and for allowing the fasteners to be driven or hammered with a power driving tool or mechanism.

For example, U.S. Pat. No. 5,231,900 to Deri, U.S. Pat. No. 5,337,635 to Habermehl, U.S. Pat. No. 5,469,767 to Habermehl, U.S. Pat. No. 5,568,753 to Habermehl et al., U.S. Pat. No. 5,699,704 to Habermehl, U.S. Pat. No. 5,826,468 to Daubinger et al., U.S. Pat. No. 5,870,933 to Habermehl et al., U.S. Pat. No. 6,123,244 to Huang, U.S. Pat. No. 6,186,385 to Huang, and U.S. Pat. No. 6,227,429 to Huang disclose several of the typical staple feeding or driving devices for power driving tools or mechanisms, each comprising an advancing or feeding or driving mechanism for engaging with and for driving or feeding or advancing collated fasteners, such as screws or nails or staples and for allowing the fasteners to be driven or hammered with a power driving tool or mechanism.

However, the typical staple feeding or driving devices normally should be held and actuated or operated with both hands of the user and may not be easily and readily actuated or operated by the user.

The present invention has arisen to mitigate and/or obviate the afore-described disadvantages of the conventional staple advance devices.

SUMMARY OF THE INVENTION

The primary objective of the present invention is to provide a staple advance device including an improved structure or configuration for effectively advancing or feeding or driving collated staples or screws or nails or fasteners which are joined together in a strip or the like.

In accordance with one aspect of the invention, there is provided a staple advance device for driving with a power driver a screwstrip comprising threaded fasteners, such as screws or the like, which are joined together in a strip comprising a receptacle including a chamber formed in the receptacle, and including a guide pathway formed in the receptacle and defined by a low level surface, a high level surface, a tilted surface located between the low and the high level surfaces, and an inclined surface formed and located beside the low level surface and communicating with the low level surface, a barrel slidably engaged in the chamber of the receptacle and engageable into and out of the chamber of the receptacle, the barrel including a longitudinal bore formed in the barrel for slidably receiving and engaging with the fastener, a mandrel engaged in the chamber of the receptacle and engageable into the bore of the barrel for engaging with the fastener and for driving the fastener to move out of the bore of the barrel selectively, a spring biasing member engaged in the chamber of the receptacle and engaged with the barrel for biasing and forcing the barrel out of the chamber of the receptacle selectively, and for allowing the barrel to be forced to engage into the chamber of the receptacle selectively, a guide plate attached to the barrel for supporting the strip and the fasteners and for guiding and limiting the fasteners to move into the bore of the barrel in series, an actuating lever pivotally attached to the barrel with a pivot axle for allowing the actuating lever to be rotated relative to the barrel, and including a guide pin attached to the actuating lever and slidably engaged in the guide pathway of the receptacle, and including a guide rod attached to the actuating lever for moving and feeding the fastener into the bore of the barrel selectively, a guide device including a gate pivotally attached to the receptacle, and a spring biasing element engaged with the gate for biasing and moving the gate to contact and engage with the tilted surface selectively, and to form a guide passage above the gate and communicating with the high level surface when the gate is biased and forced to engage with the tilted surface of the receptacle, and for forming an endless shaped structure for the guide pathway of the receptacle selectively.

The guide plate includes a pusher slidably attached to the guide plate and removable relative to the guide plate, the pusher includes a guide groove formed in the pusher for slidably receiving and engaging with the guide rod.

The guide device includes a board attached to the receptacle, a seat attached to the board and located in the guide pathway of the receptacle, and the spring biasing element is attached to the seat and engaged with the gate for biasing and forcing the gate to contact and engage with the tilted surface of the guide pathway of the receptacle.

The barrel includes an inlet formed in the barrel and communicating with the bore of the barrel, and arranged for allowing the fastener to be engaged into the bore of the barrel, The barrel includes an outlet formed in the barrel and located in a front portion of the barrel for guiding the fastener to move out of the bore of the barrel.

The barrel includes a guide block pivotally attached to the barrel at the front portion of the barrel, and a spring biasing element engaged onto the guide block for biasing and forcing the guide block to engage with the fastener and for guiding the fastener to move out of the bore of the barrel. The guide block includes a guide depression for engaging with the fastener and for guiding and directing the fastener relative to the barrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
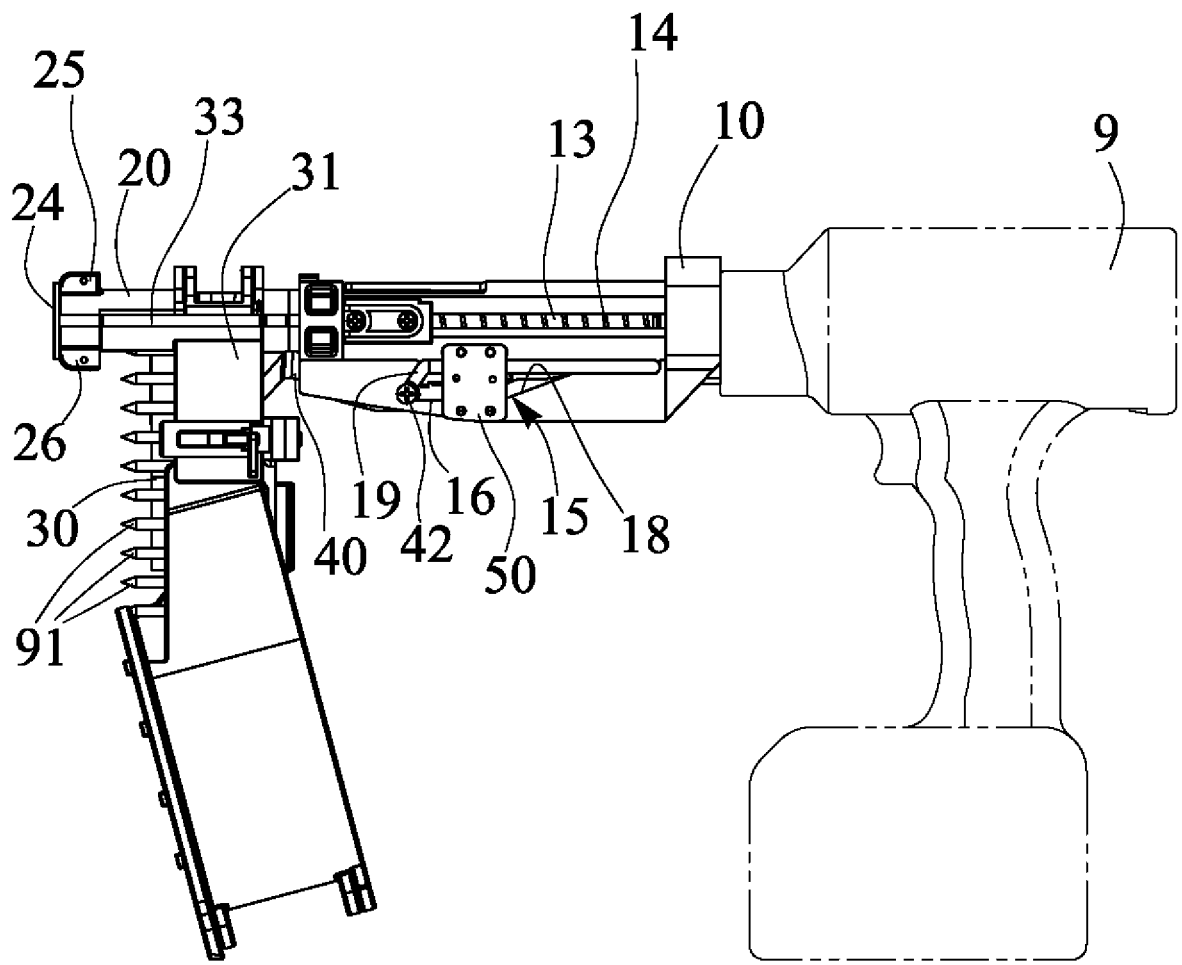
FIG. 1 is a side plan schematic view of a staple advance device in accordance with the present invention.
Figure 2:
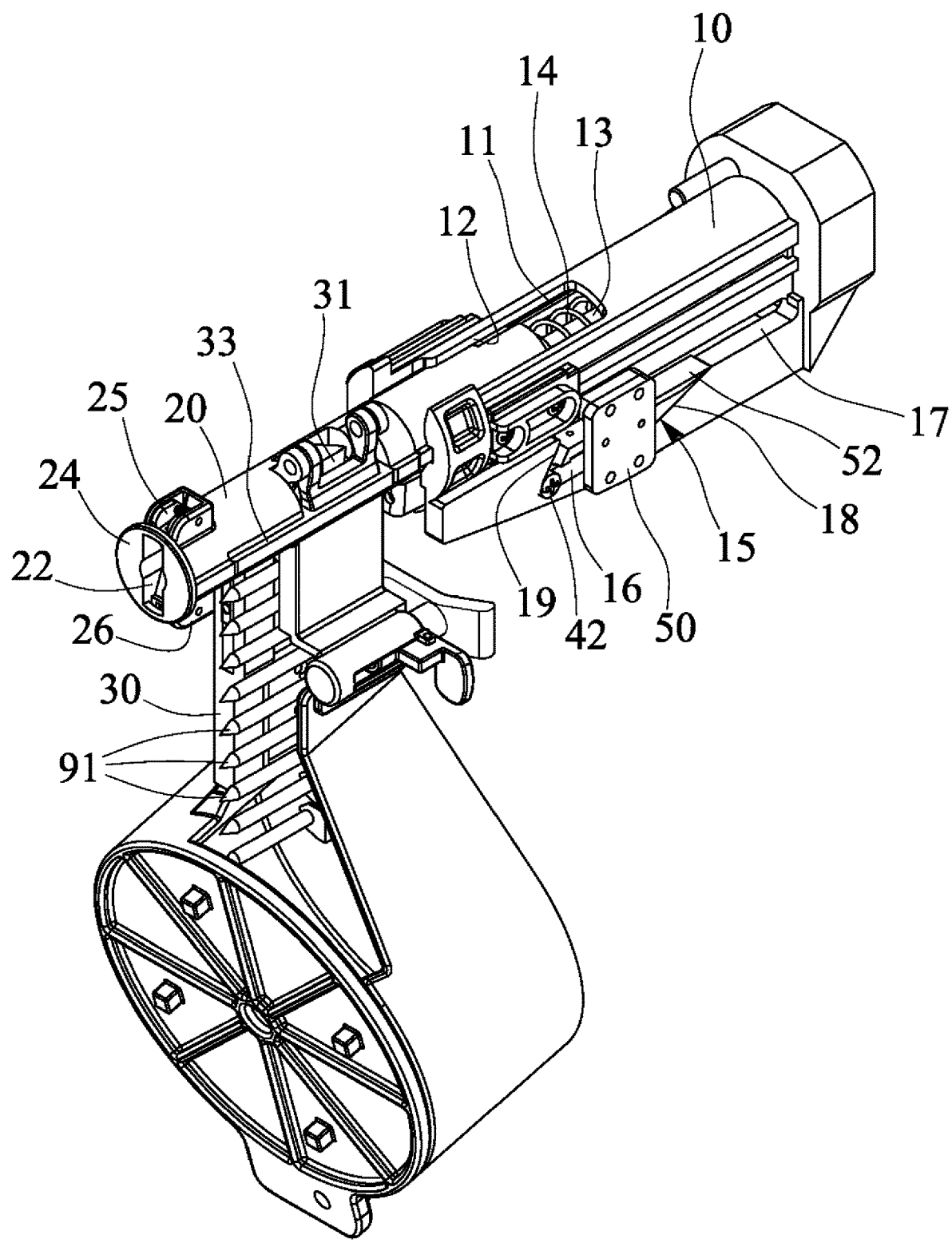
FIG. 2 is a front and upper perspective view of the staple advance device.
Figure 3:
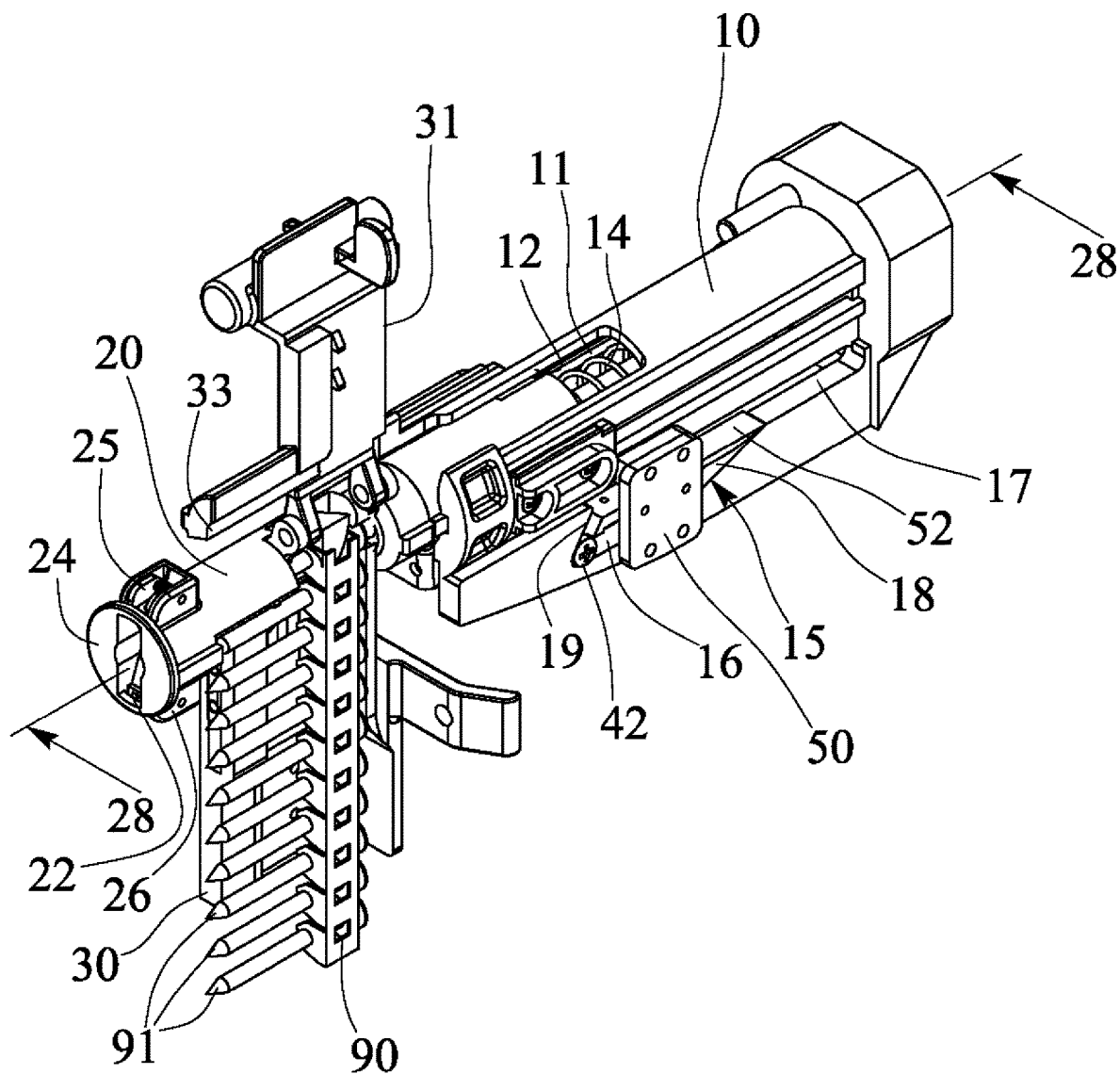
FIG. 3 is a partial front and upper perspective view of the staple advance device.
Figure 4:
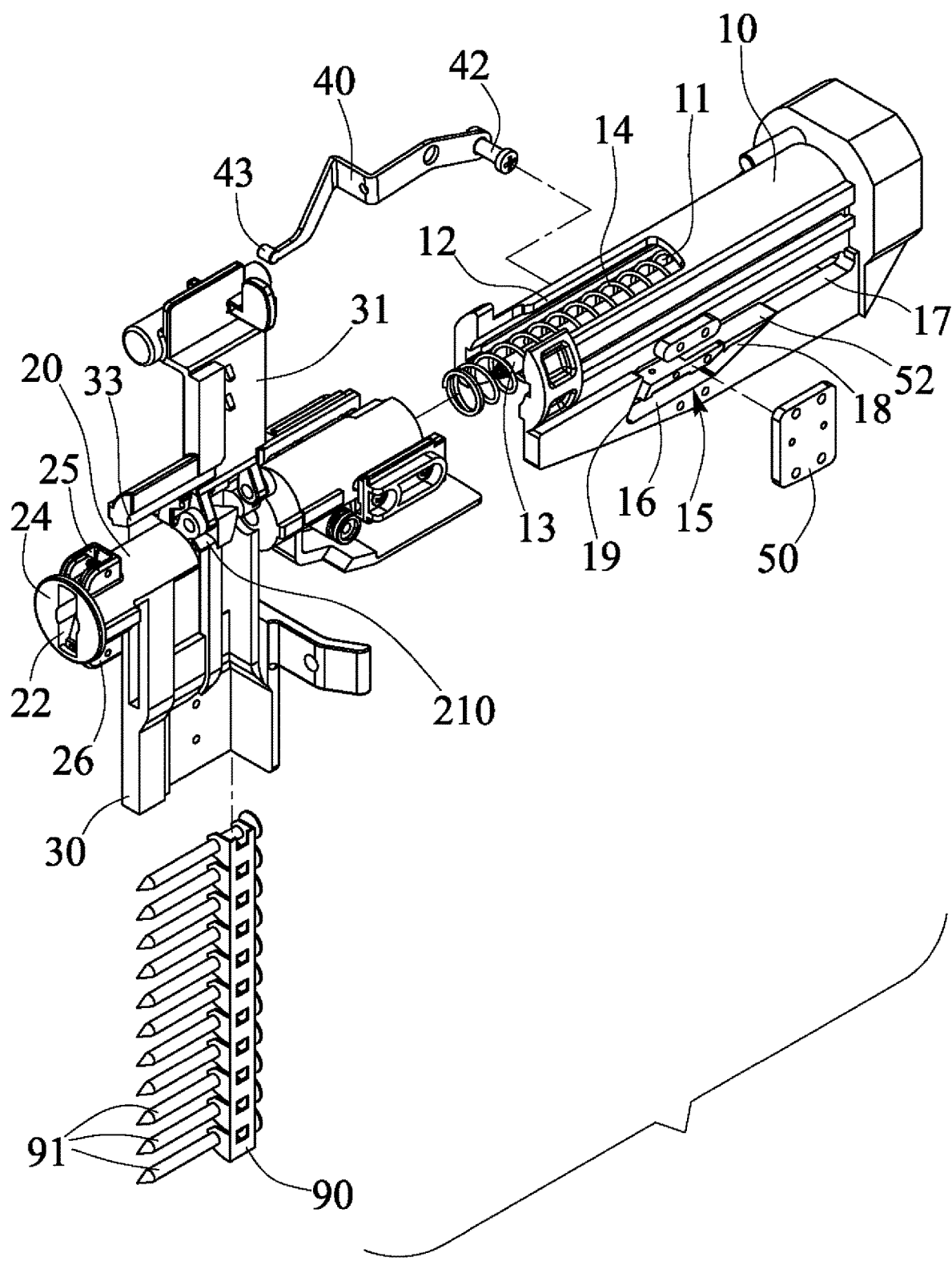
FIG. 4 is a partial exploded view of the staple advance device.
Figure 5:
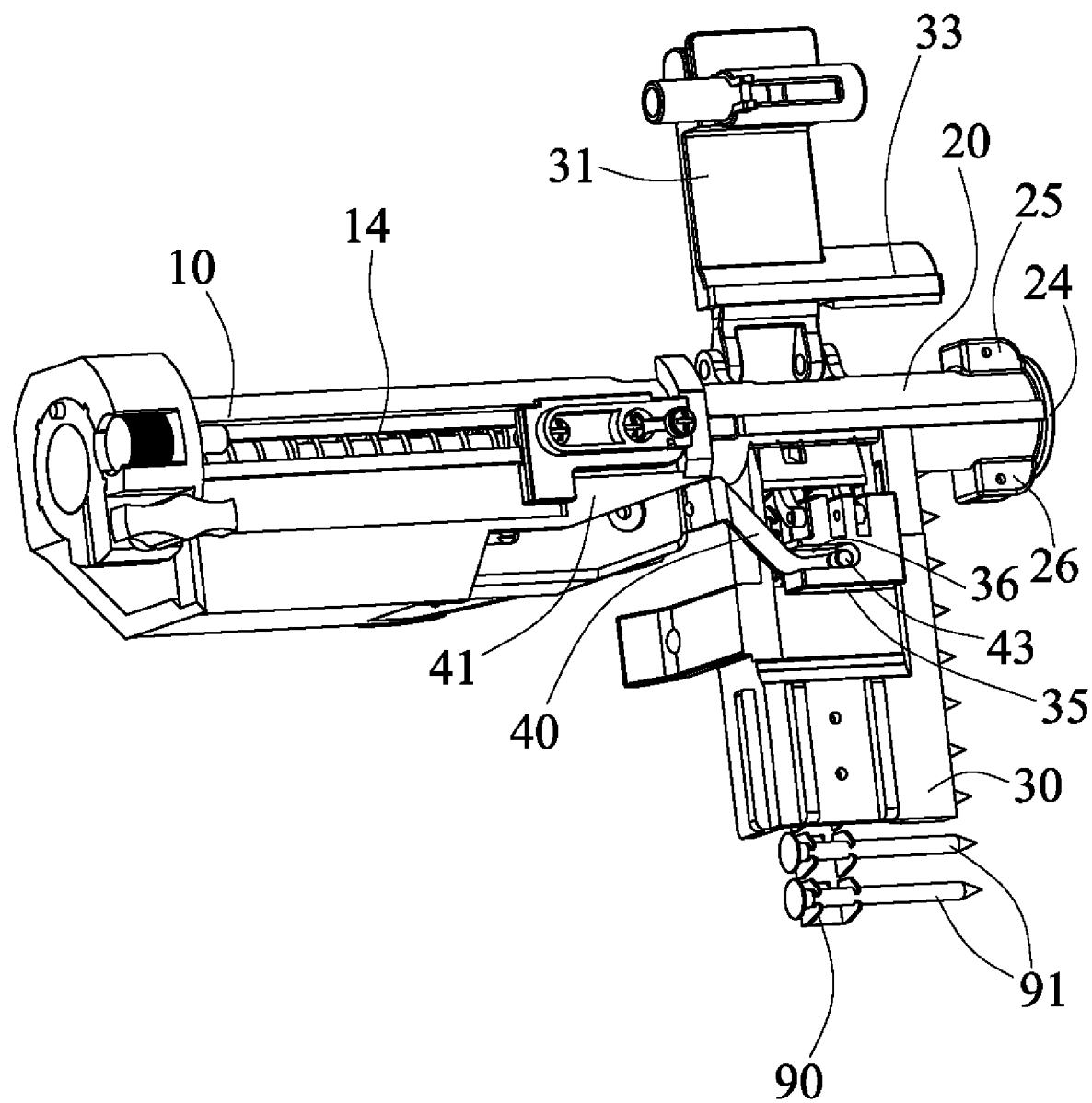
FIG. 5 is a partial rear perspective view of the staple advance device.
Figure 6:
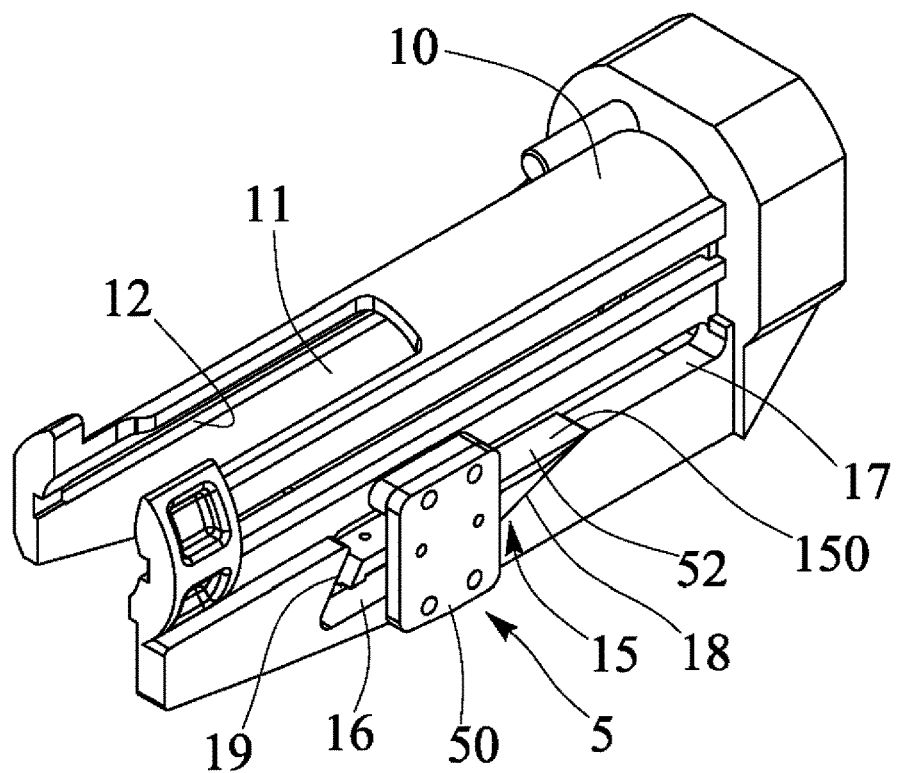
FIG. 6 is a partial perspective view illustrating a housing or receptacle of the staple advance device.
Figure 7:
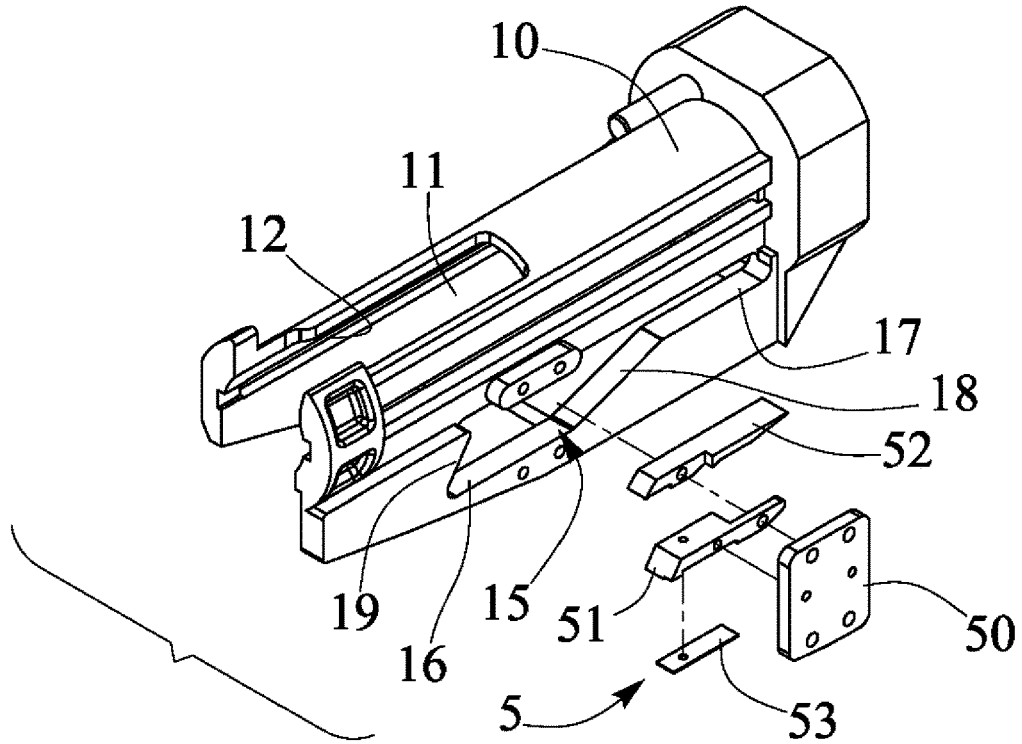
FIG. 7 is a partial exploded view of the receptacle of the staple advance device.
Figure 8:
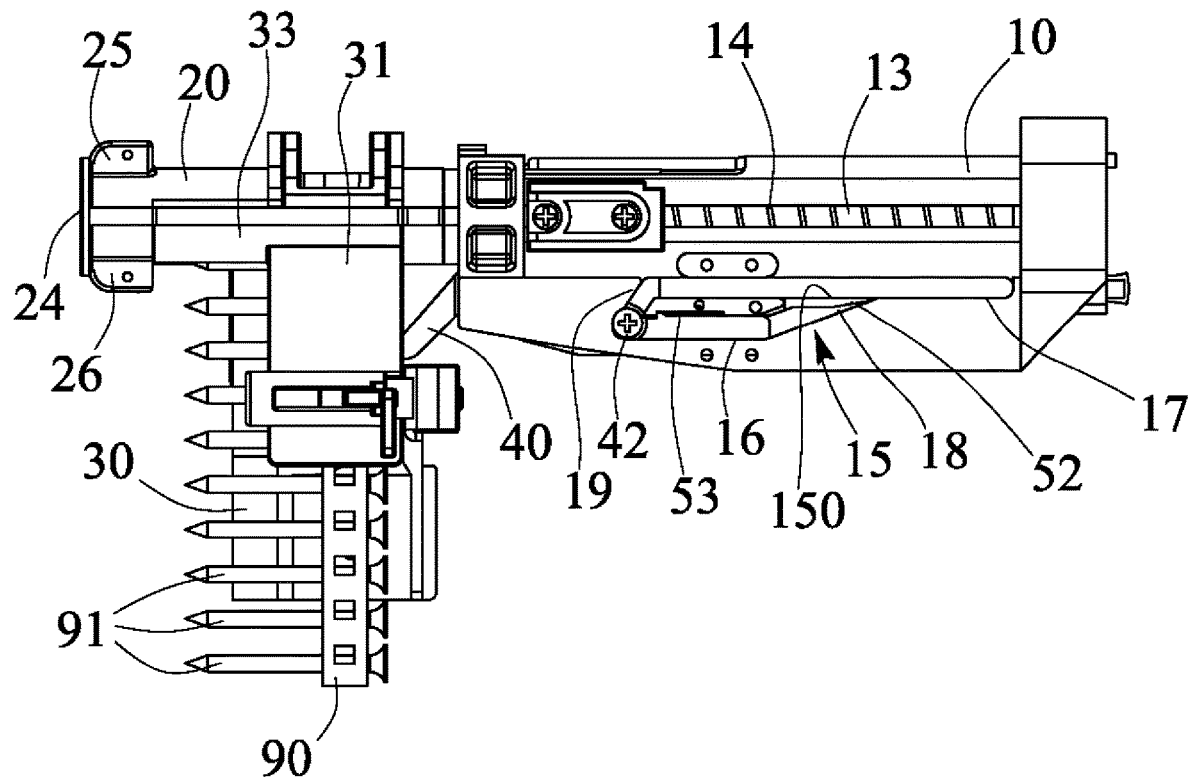
FIG. 8 is a partial side plan schematic view illustrating the operation of the staple advance device.
Figure 9:
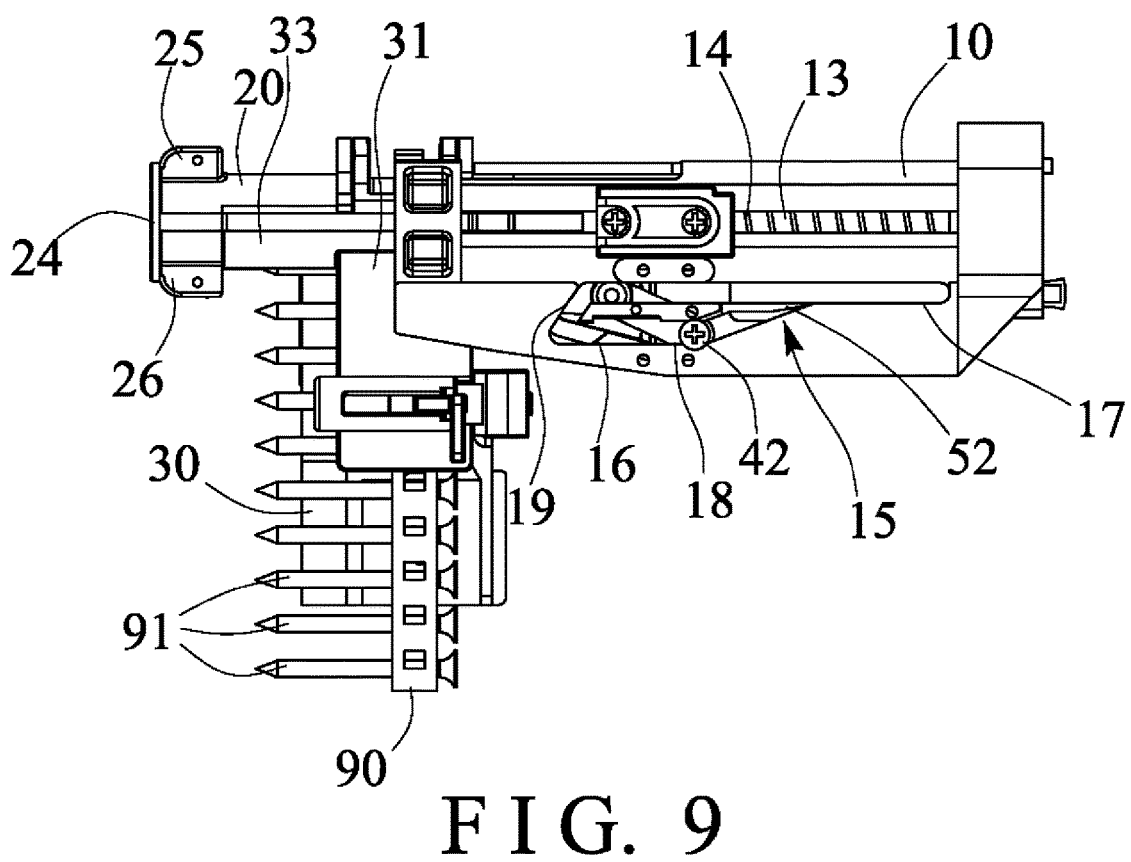
FIGS. 9, 10, 11, 12, 13, 14, 15, 16, 17 are partial side plan schematic views similar to FIG. 8, illustrating the operation of the staple advance device.
Figure 10:
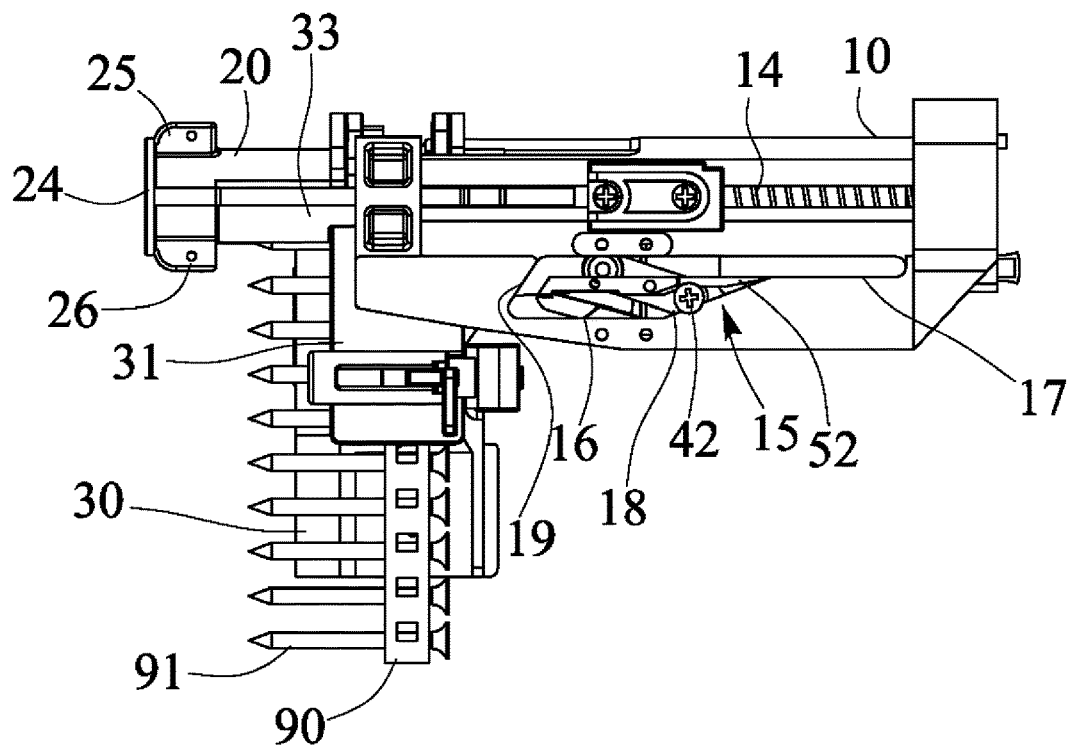
Figure 11:
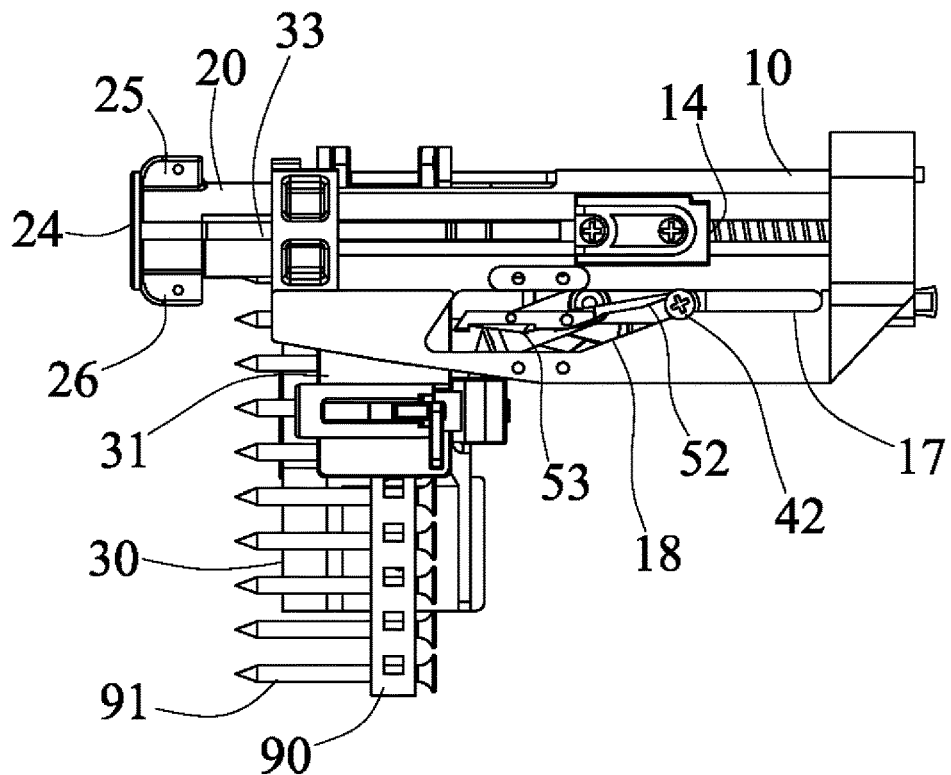
Figure 12:
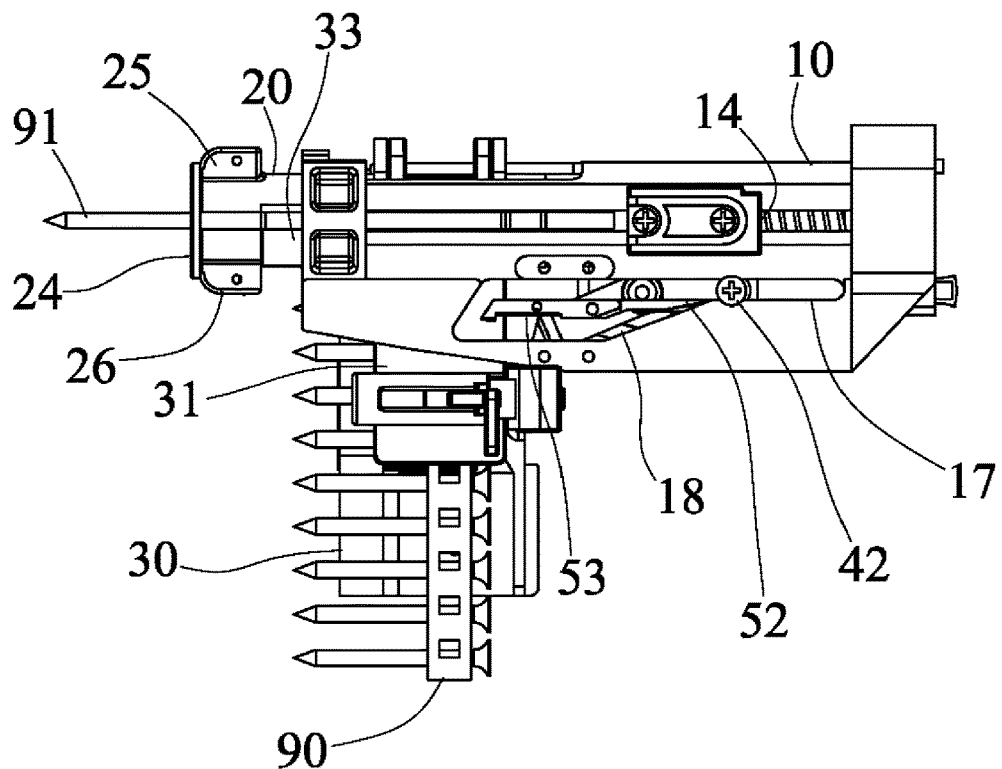
Figure 13:
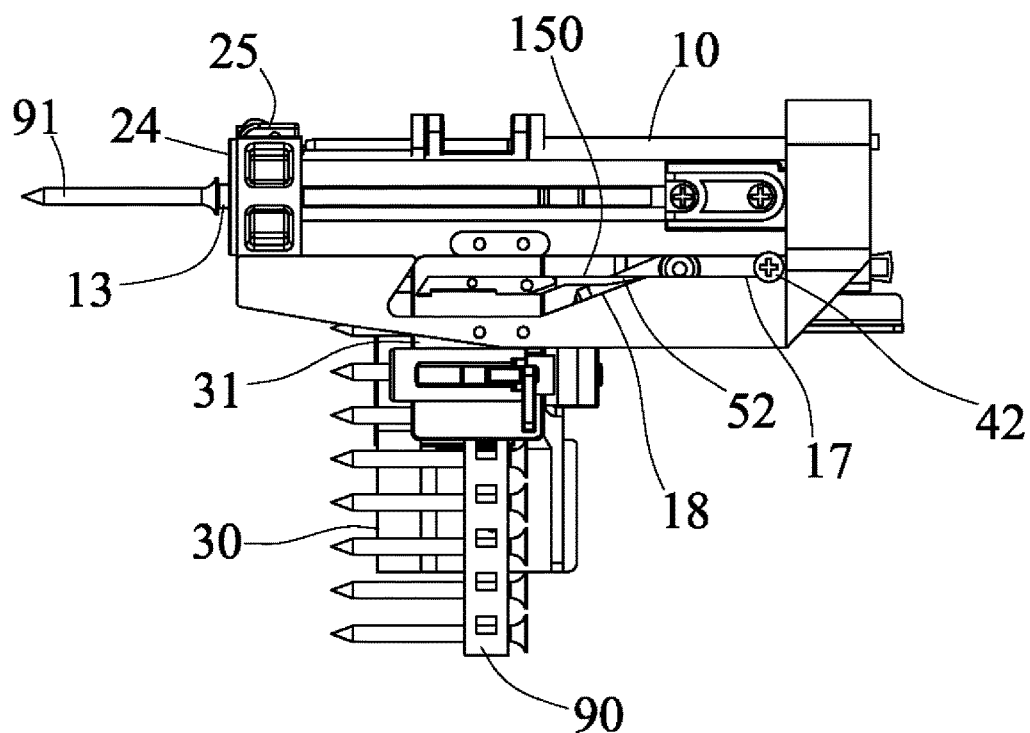
Figure 14:
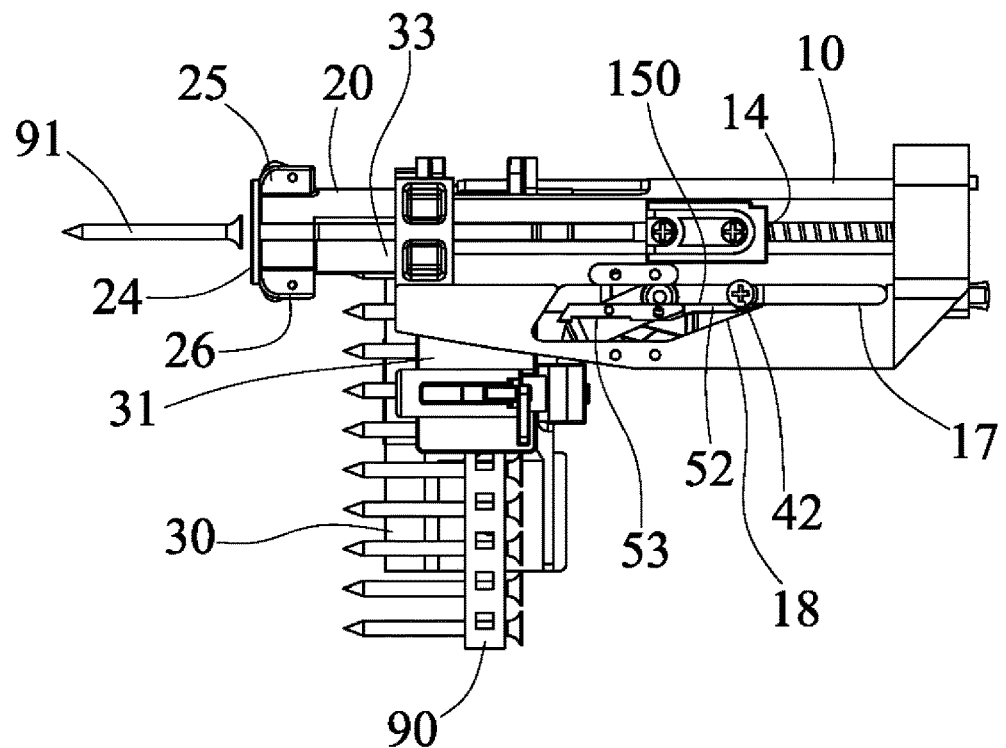
Figure 15:
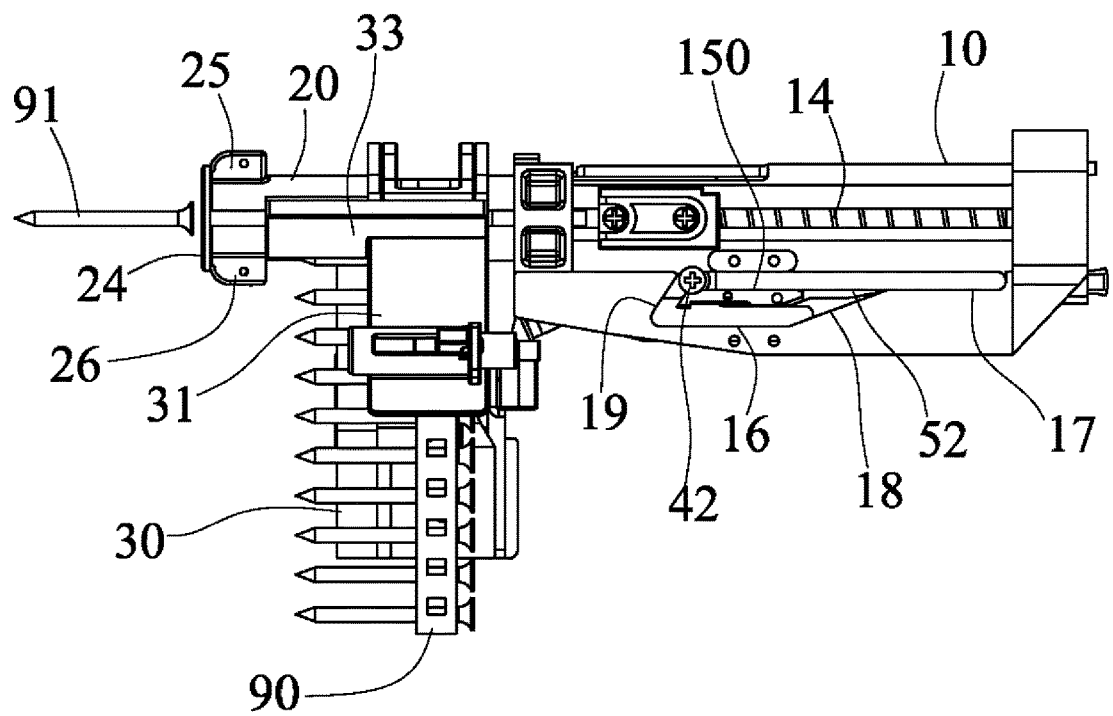
Figure 16:
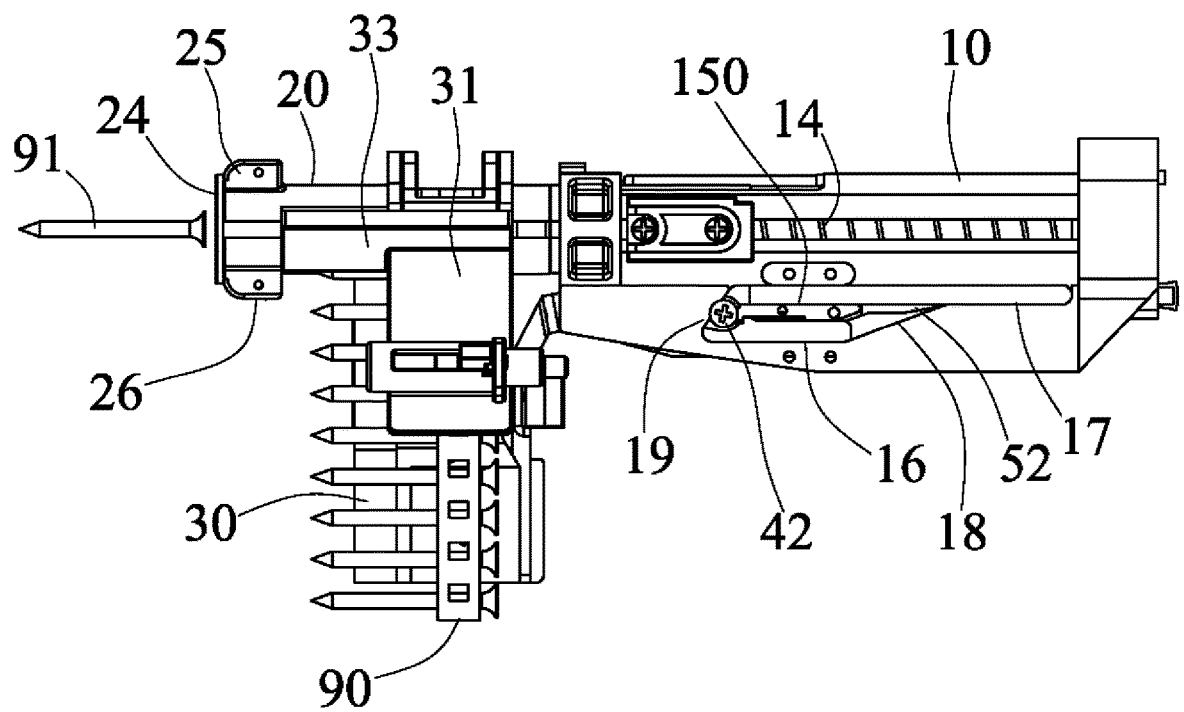
Figure 17:
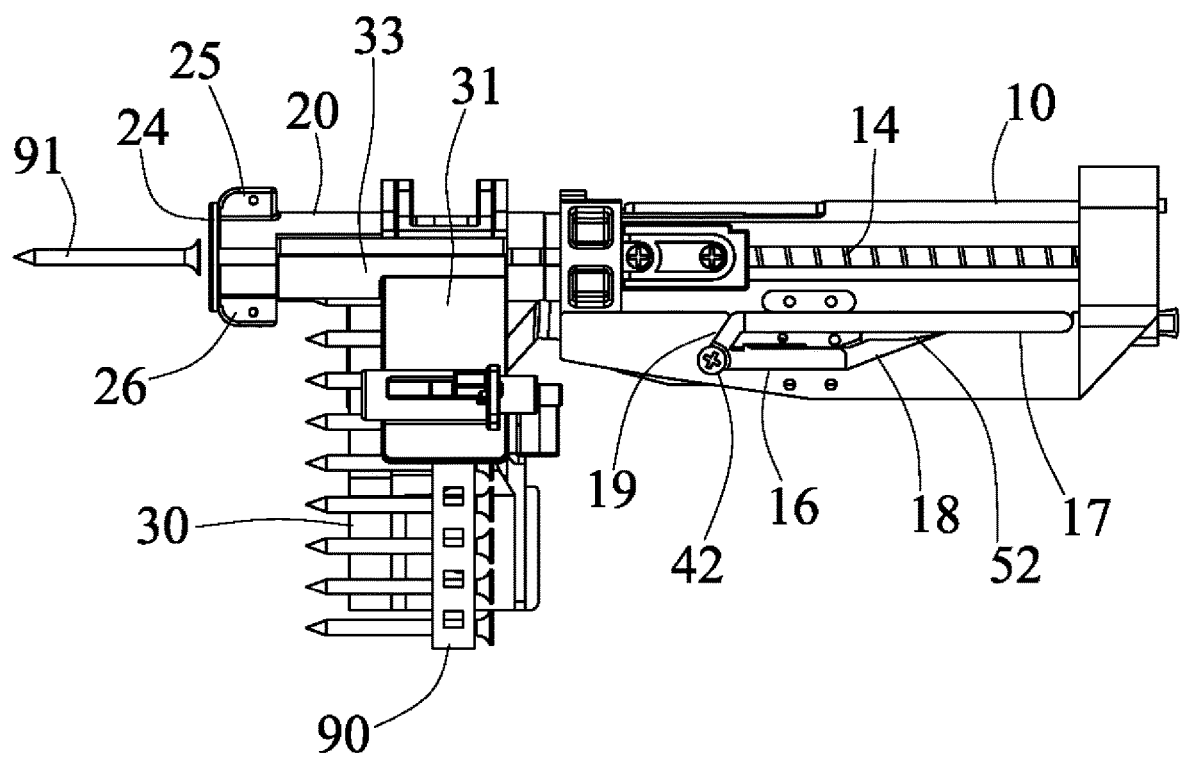
Figure 18:
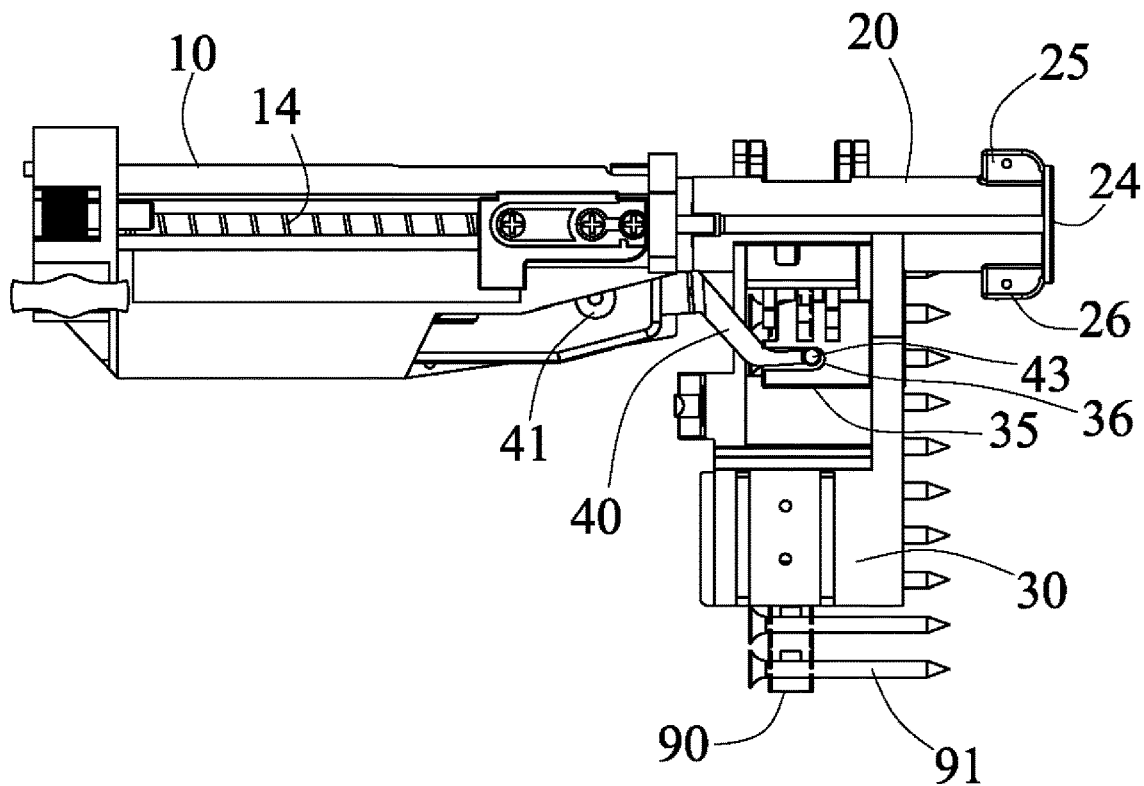
FIGS. 18, 19, 20, 21, 22, 23, 24, 25, 26, 27 are partial side plan schematic views as seen from another direction opposite to that shown in FIGS. 8-17, illustrating the operation of the staple advance device.
Figure 19:
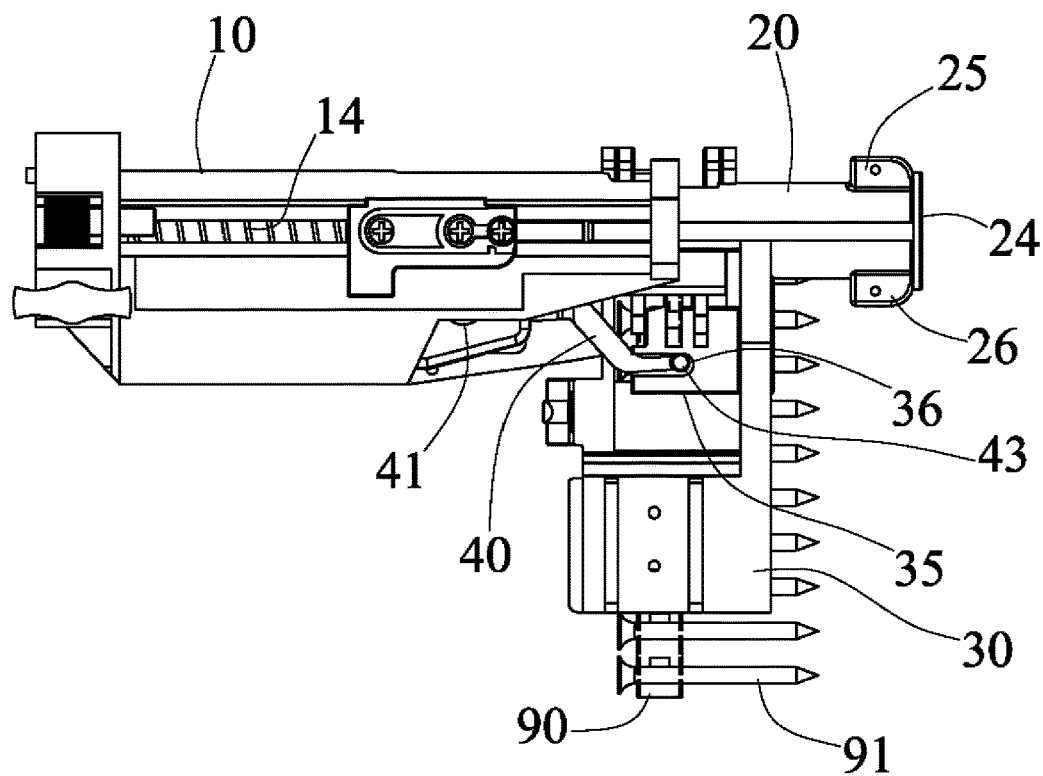
Figure 20:
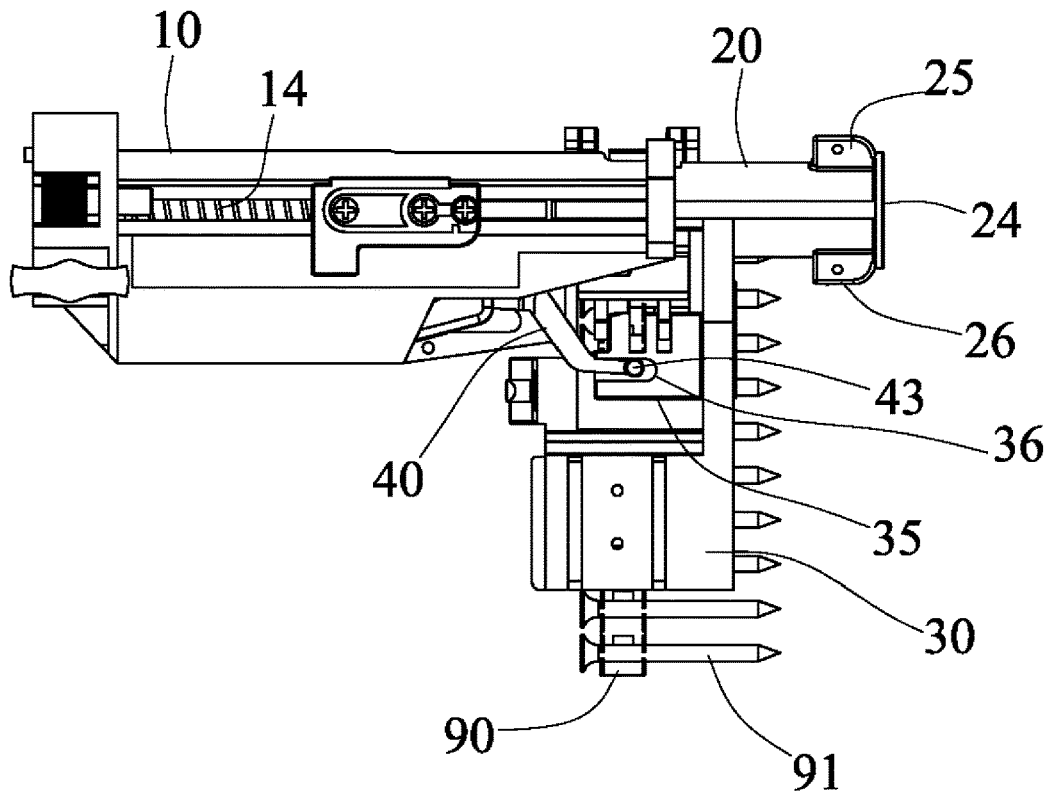
Figure 21:
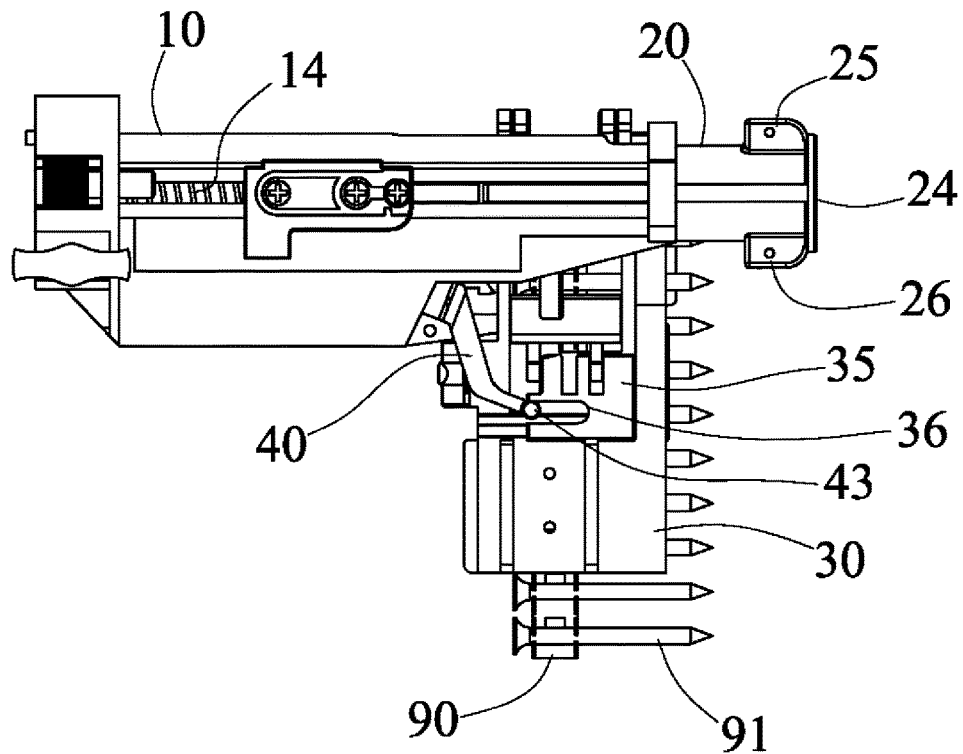
Figure 22:
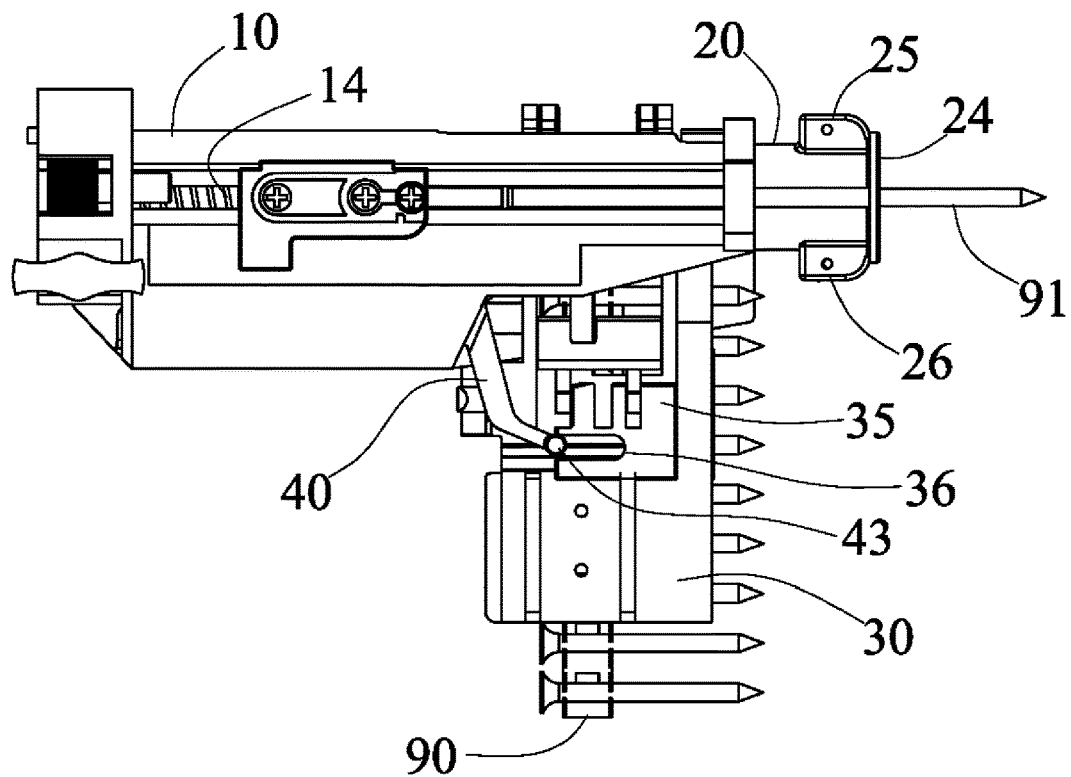
Figure 23:
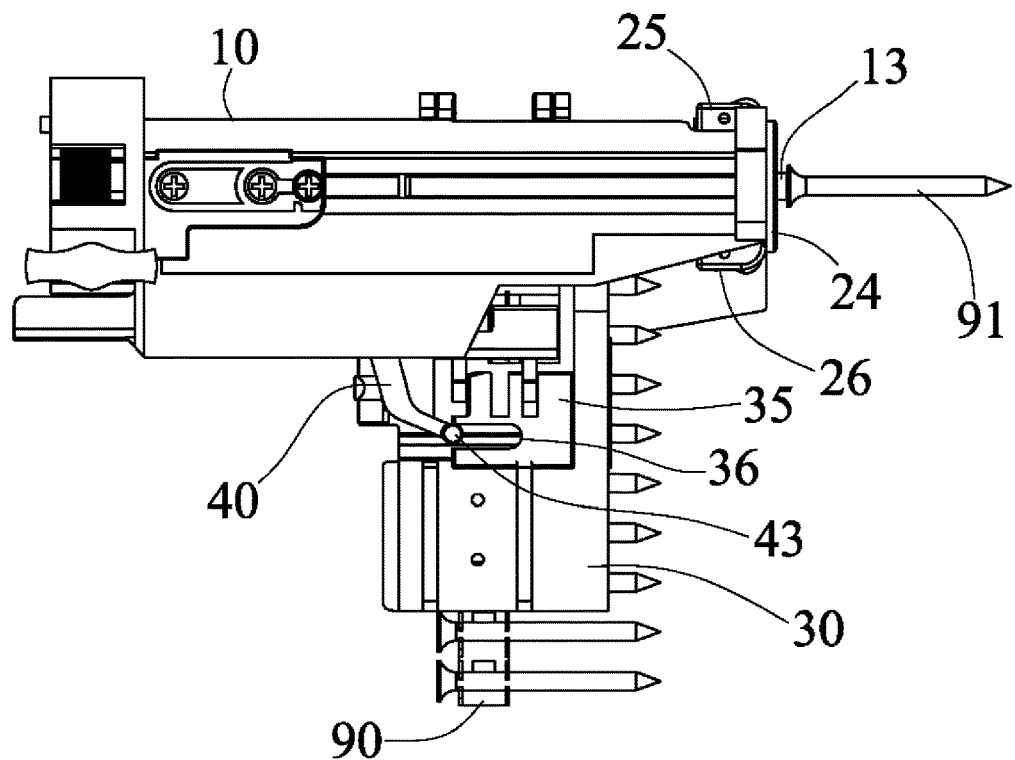
Figure 24:
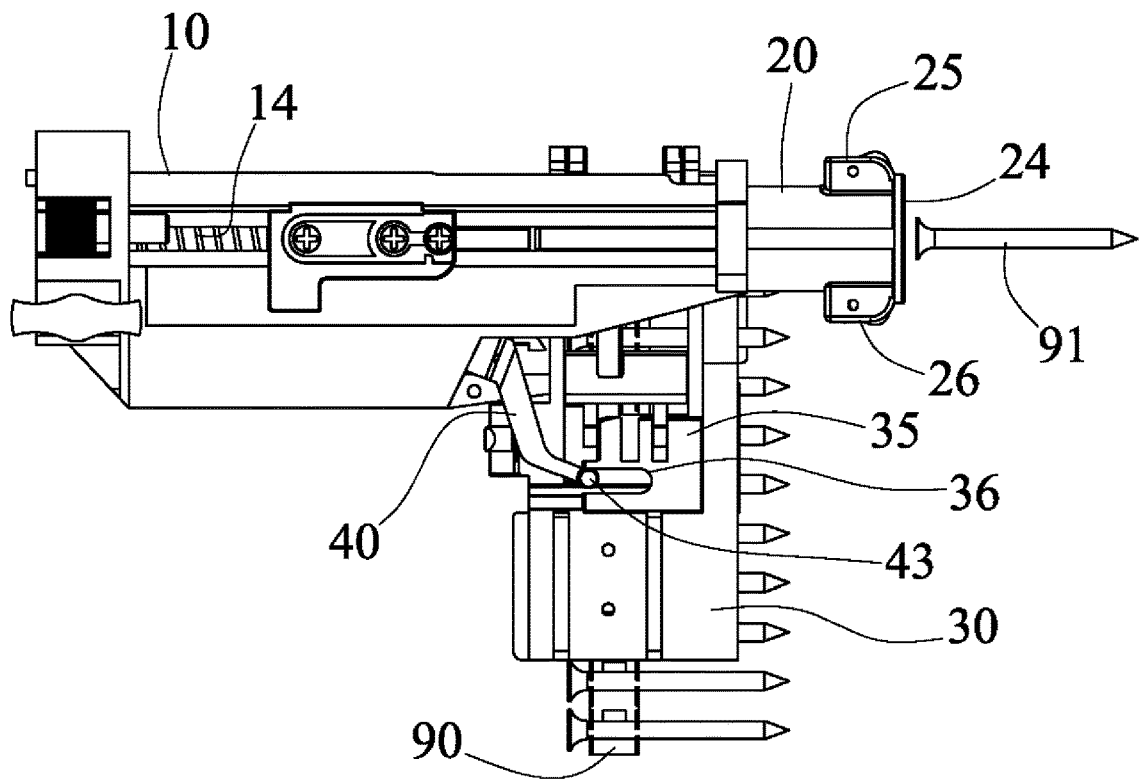
Figure 25:
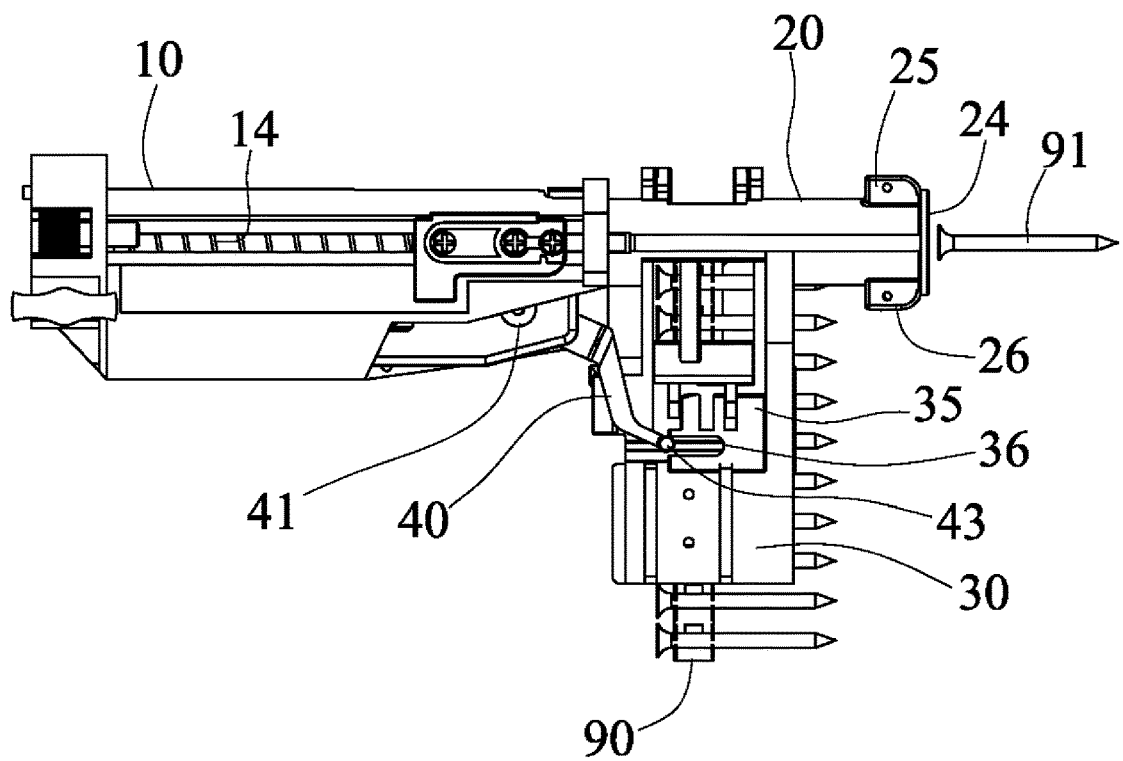
Figure 26:
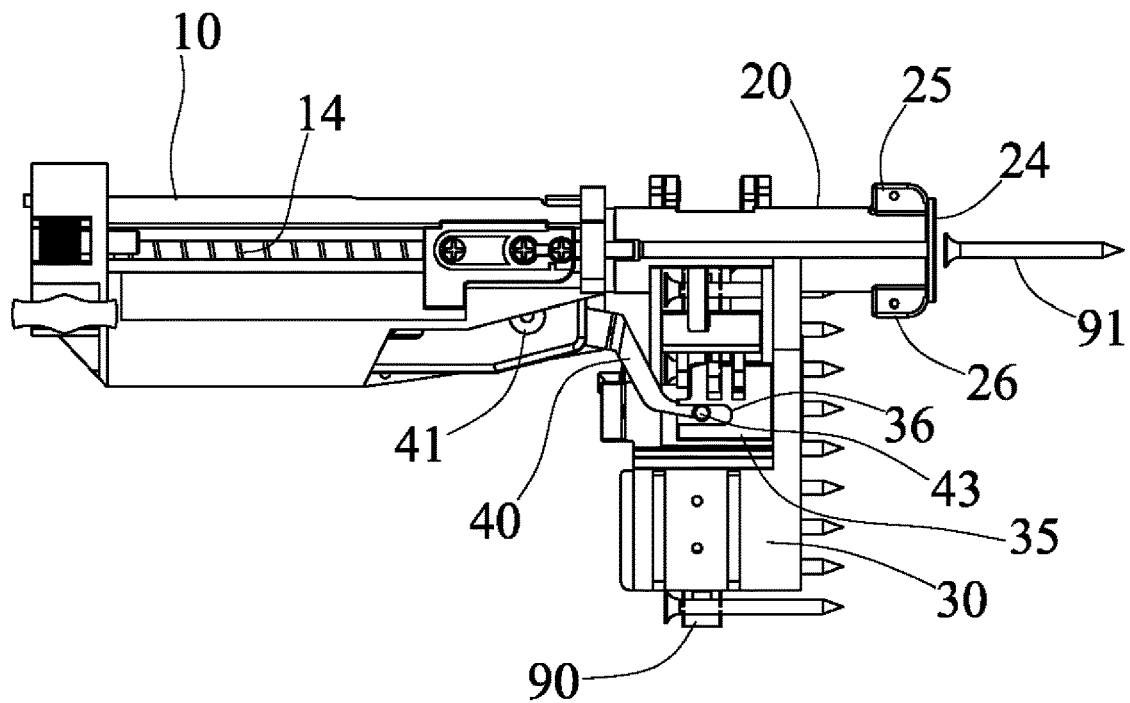
Figure 27:
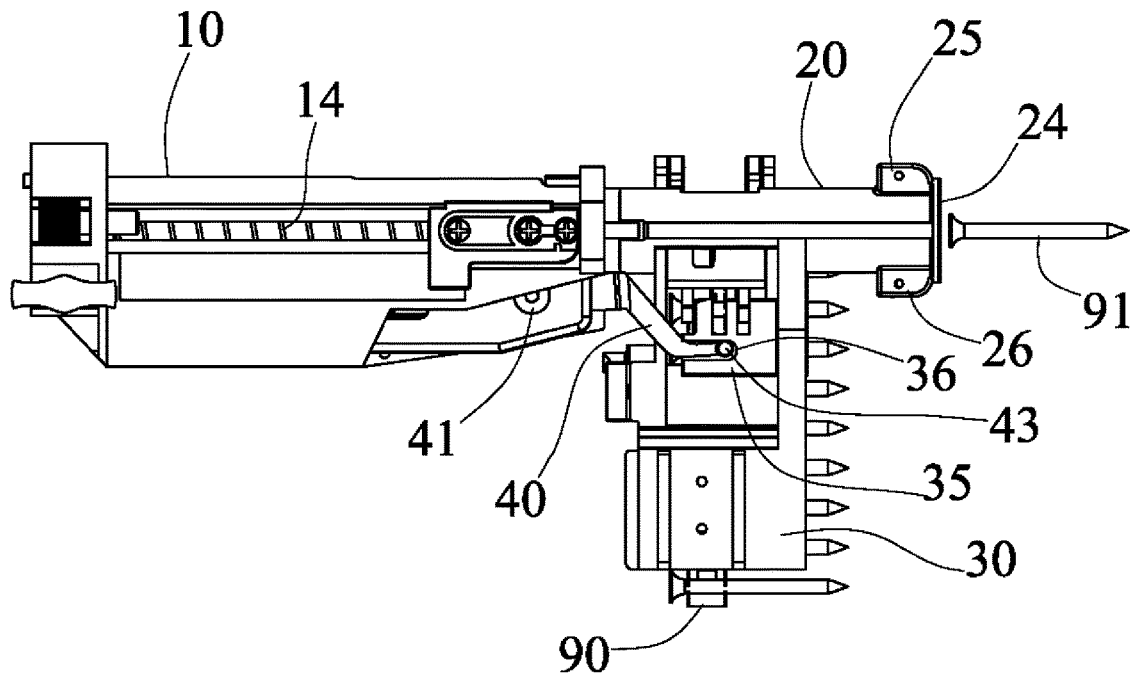
Figure 28:
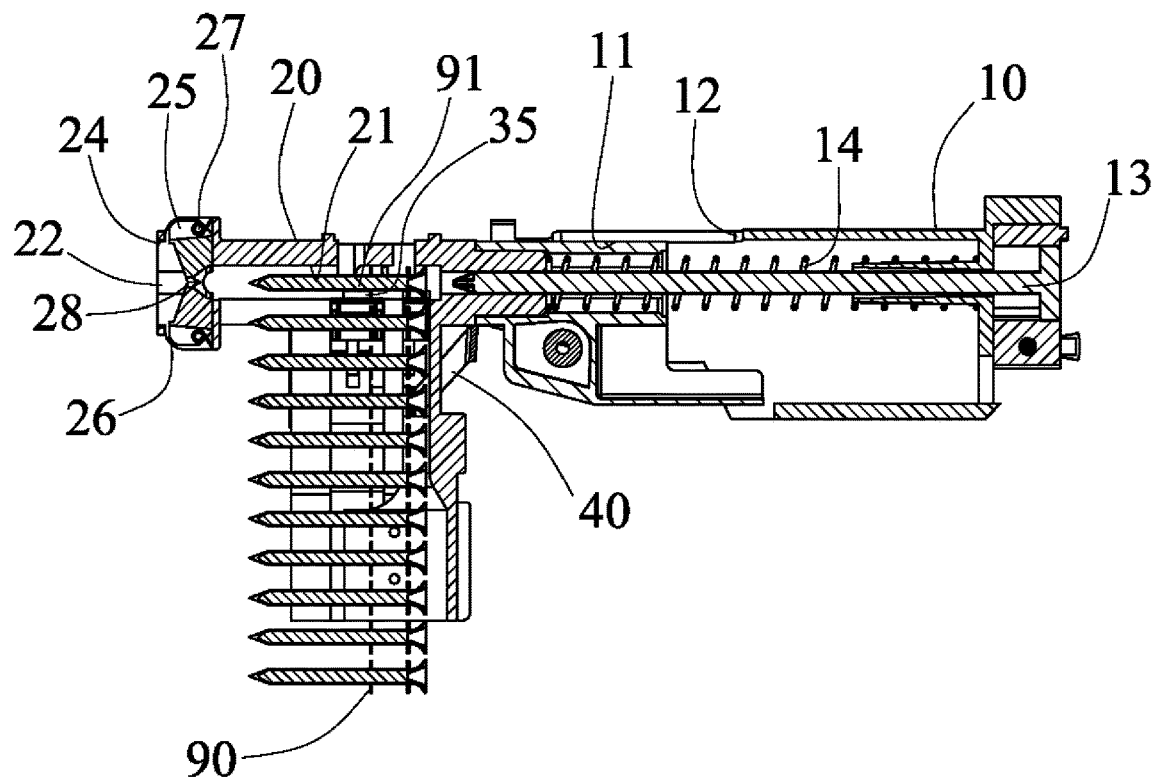
FIG. 28 is a partial cross sectional view of the staple advance device, taken along lines 28-28 of FIG. 3, illustrating the operation of the staple advance device.
Figure 29:
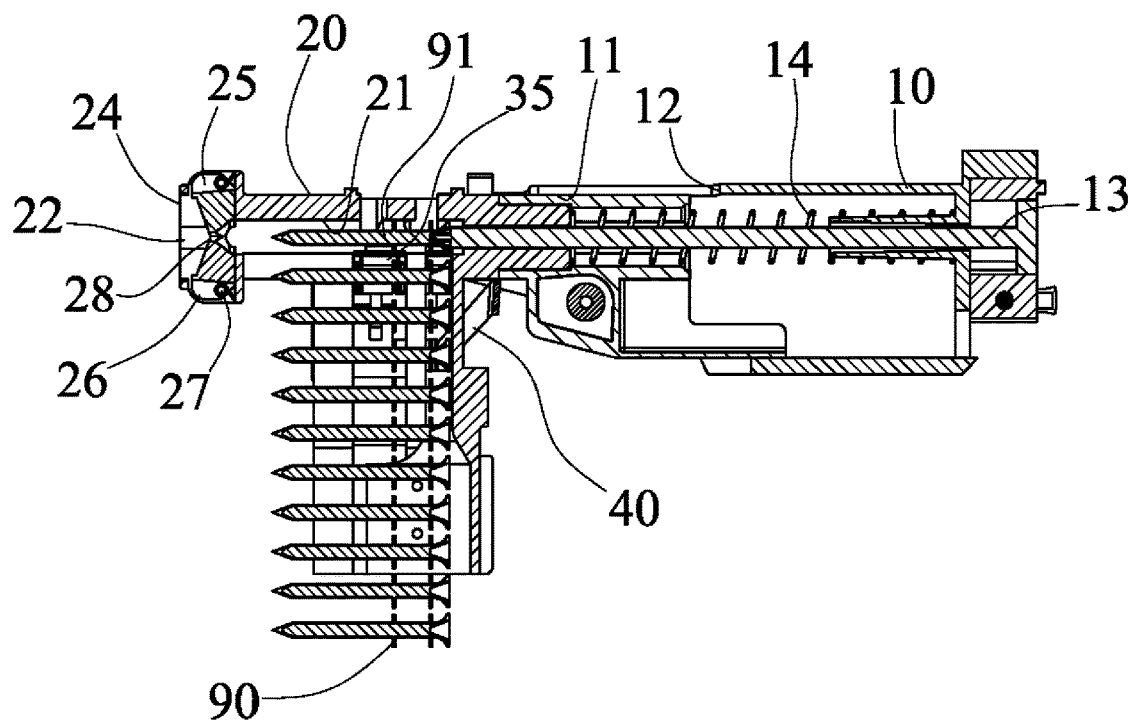
FIGS. 29, 30, 31, 32, 33, 34, 35, 36, and 37 are partial cross sectional views similar to FIG. 28, illustrating the operation of the staple advance device.
Figure 30:
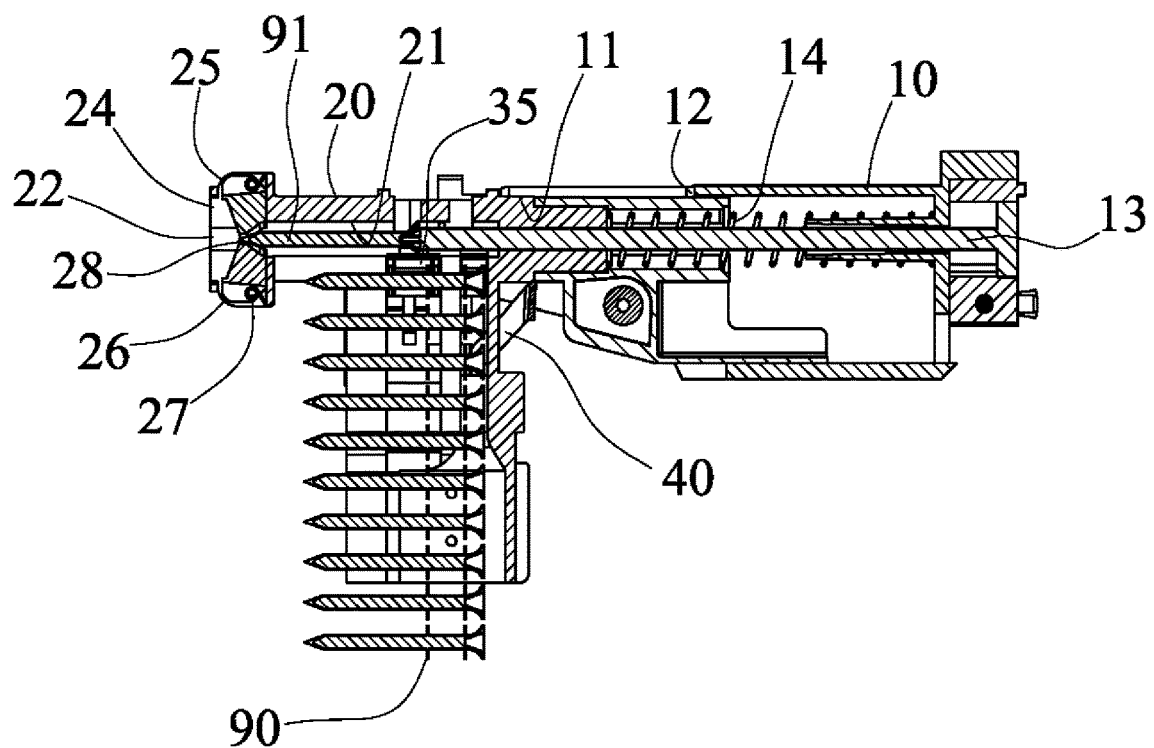
Figure 31:
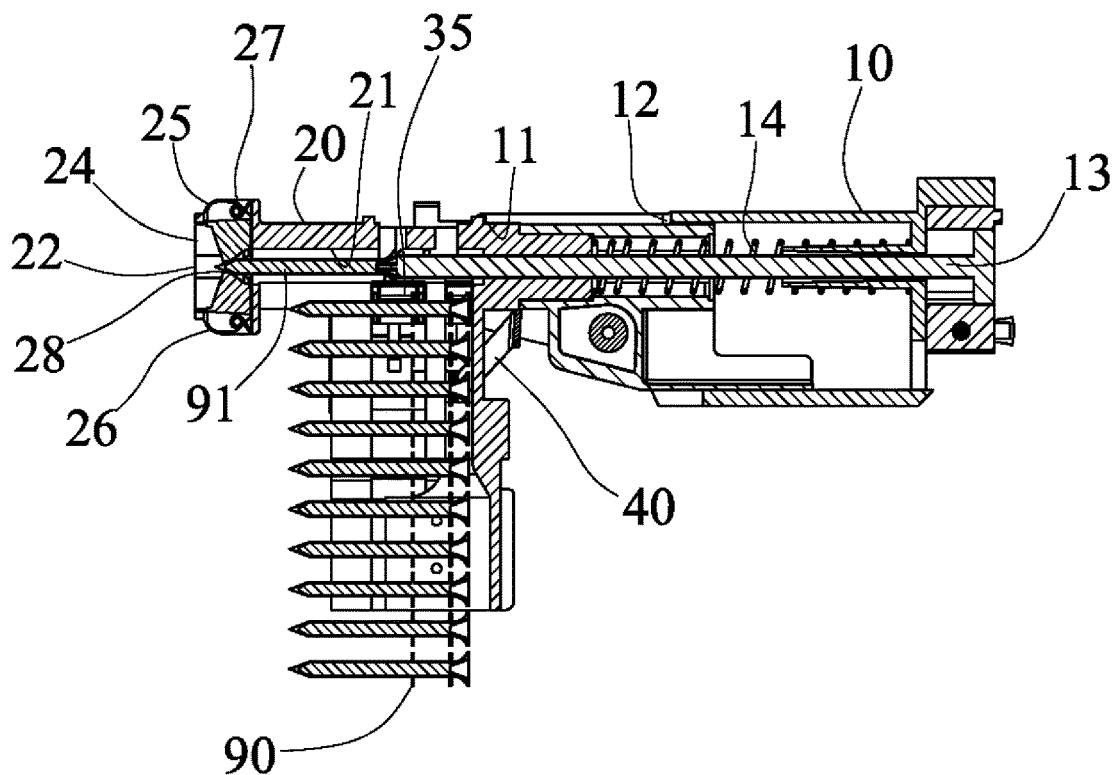
Figure 32:
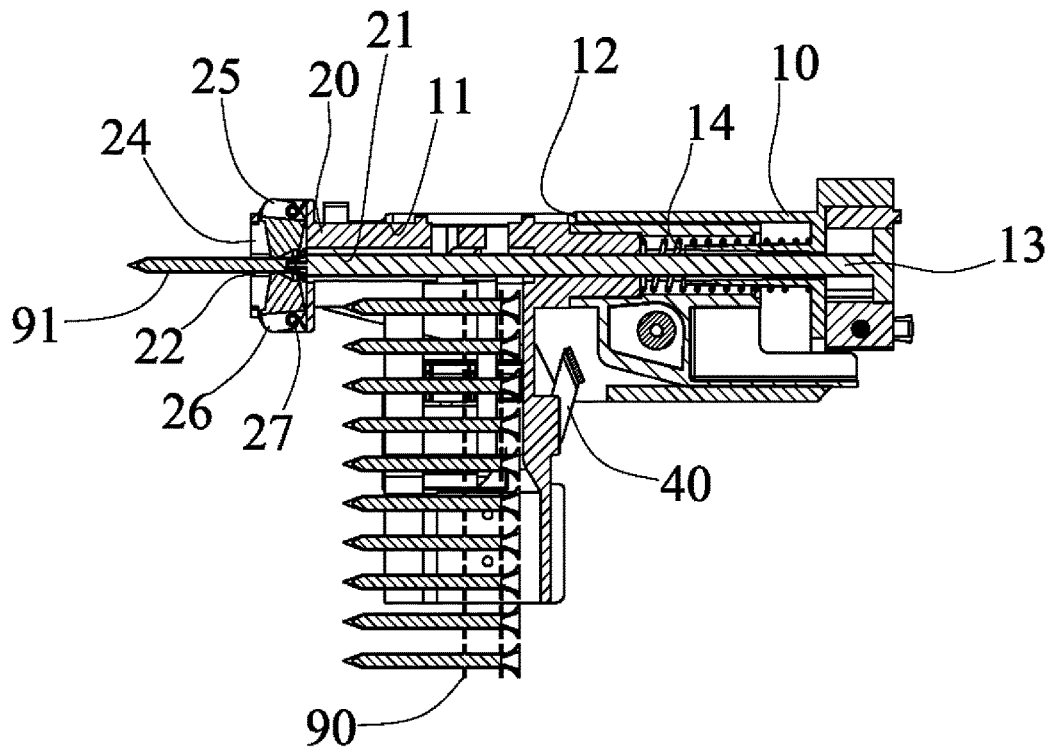
Figure 33:
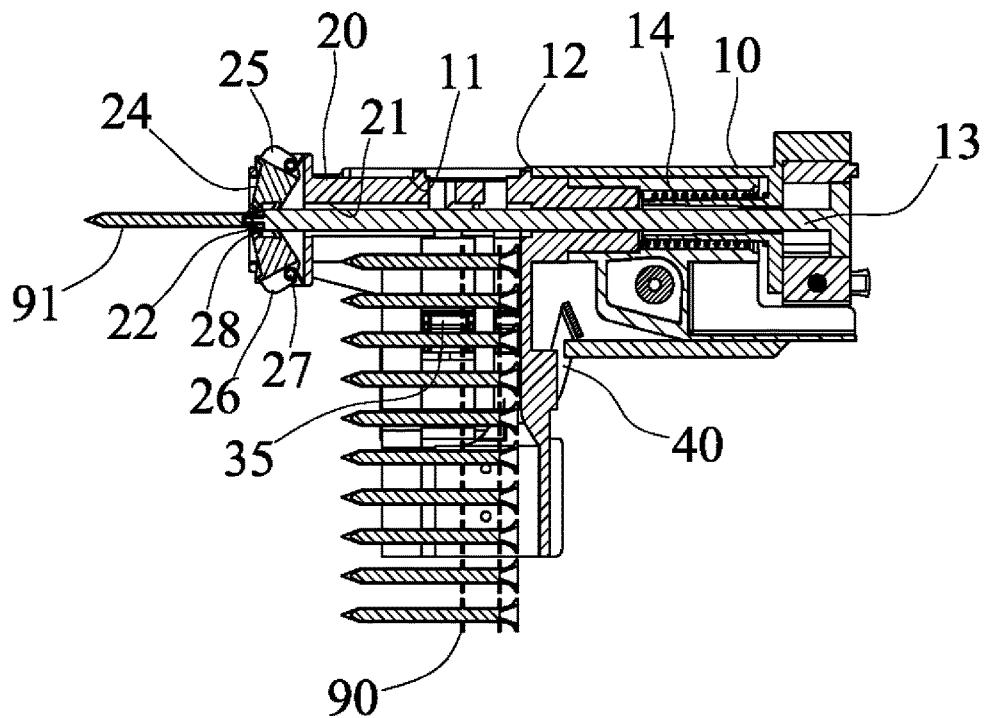
Figure 34:
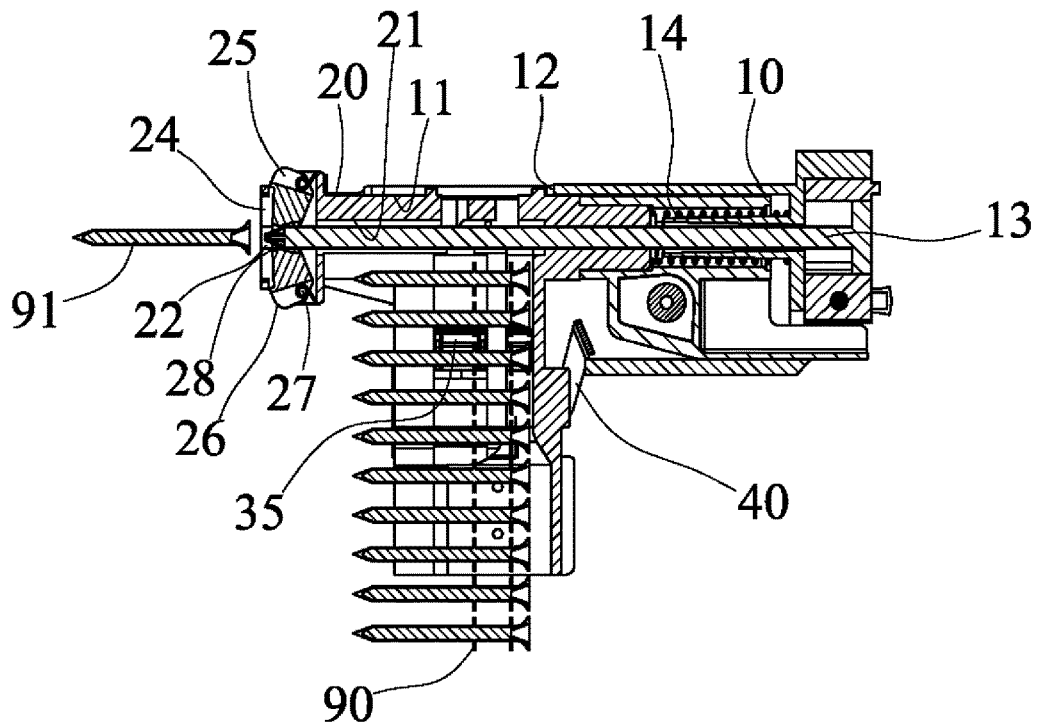
Figure 35:
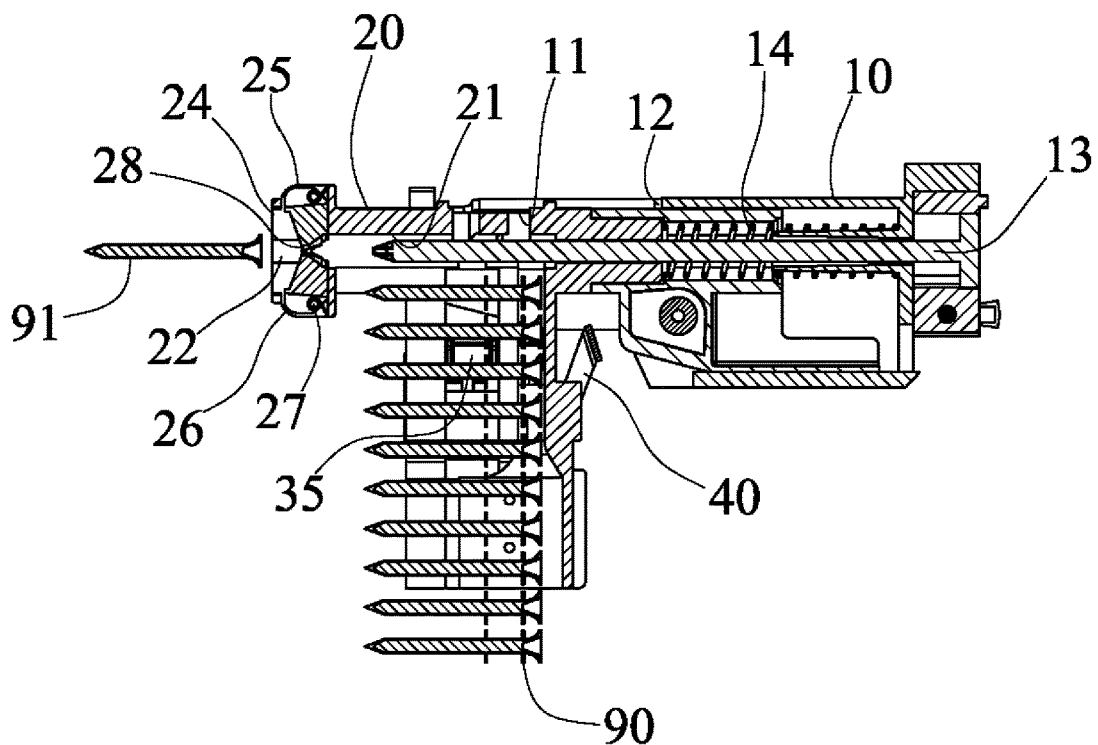

Referring to the drawings, and initially to FIGS. 1-8, a staple advance device in accordance with the present invention comprises a housing or receptacle 10 for engaging with and for connecting or coupling to a power driving tool or mechanism 9 (FIG. 1), such as a stapler or the like, and for advancing or feeding or supplying the collated staples or screws or nails or fasteners 91 which are joined together in a strip 90 or the like to the power driving tool or mechanism 9, and for allowing the fasteners 91 to be driven or hammered with the power driving tool or mechanism 9. The housing or receptacle 10 includes a compartment or chamber 11 formed therein (FIGS. 6, 7), and includes a groove or guiding channel 12 formed therein and communicating with the chamber 11 of the receptacle 10.

A casing or barrel 20 is slidably received or engaged in the chamber 11 of the receptacle 10 (FIGS. 28-37) and removable or engageable into and out of the chamber 11 of the receptacle 10, and includes an elongated or longitudinal hole or bore 21 formed therein for slidably receiving or engaging with the fasteners 91, as also shown in FIGS. 28-37. A nail driver or metal mandrel 13 is disposed or engaged in the chamber 11 of the receptacle 10, and extendible or engageable into the bore 21 of the barrel 20 (FIGS. 28-37) for selectively engaging with the fastener 91 and for selectively driving or actuating the fastener 91 to move out of the bore 21 of the barrel 20. A spring biasing member 14 is also disposed or engaged in the chamber 11 of the receptacle 10, and contacted or engaged with the barrel 20 for selectively biasing and forcing or moving the barrel 20 out of the chamber 11 of the receptacle 10, and also for allowing the barrel 20 to be forced to move or engage into the chamber 11 of the receptacle 10 selectively.

The barrel 20 includes an opening or inlet 210 formed therein (FIG. 4) and communicating with the bore 21 of the barrel 20, and arranged for allowing the fasteners 91 to be moved or engaged into the bore 21 of the barrel 20, and includes an outlet 22 formed therein, such as formed and located in the outer or front portion 24 thereof for guiding the fasteners 91 to move out of the bore 21 of the barrel 20. A guide panel or plate 30 is attached or mounted or secured to the barrel 20 for supporting the strip 90 and the fastener 91 and for guiding and limiting the fasteners 91 to move into the bore 21 of the barrel 20 one by one or in series. A cover 31 is pivotally or rotatably attached or mounted or secured to the barrel 20 and pivotal or rotatable relative to the barrel 20 between an outwardly pivoted open position (FIGS. 3-5) and an inwardly pivoted folded position (FIGS. 1-2 and 8-17), and includes a tongue or cap 32 extended therefrom for selectively covering and shielding and protecting the fasteners 91 from being disengaged or separated from the barrel 20 inadvertently.

One or more (such as two) pawls or guide blocks 25, 26 are pivotally or rotatably attached or mounted or secured to the barrel 20 and arranged or located above and below the outlet 22 at the outer or front portion 24 of the barrel 20, and a spring biasing element 27 is attached or mounted or engaged onto the respective guide block 25, 26 (FIGS. 28-37) for biasing and forcing or moving the guide blocks 25, 26 to contact or engage with the respective fastener 91 and for stably guiding the respective fastener 91 to move out of the bore 21 of the barrel 20. It is preferable that the guide blocks 25, 26 each include a guide depression 28 formed therein for slidably receiving or engaging with the fasteners 91 and for stably guiding and erecting or directing the fasteners 91 relative to the barrel 20. The guide plate 30 further includes a guide channel or groove 36 formed therein, such as formed in a pusher 35 of the guide plate 30, as best shown in FIGS. 5 and 18-27, in which the pusher 35 is slidably attached or mounted or secured to the guide plate 30 and removable up and down relative to the guide plate 30.

As shown in FIGS. 1-4 and 6-17, the receptacle 10 further includes a guide pathway 15 formed therein, such as formed in one of its side portions thereof, and formed or defined by a low level surface 16, a high level surface 17, an inclined or tilted surface 18 formed and arranged or located between the low and the high level surfaces 16, 17, and another tilted or inclined surface 19 formed and arranged or located beside the low level surface 16 and communicating with or connecting or coupling to the low level surface 16. A guide device 5 includes a panel or carrier or board 50 attached or mounted or secured to the receptacle 10, a fixed seat 51 attached or mounted or secured to the receptacle 10 and/or to the board 50 and arranged or located or extended into the guide pathway 15 of the receptacle 10, and a guide lever or gate 52 pivotally or rotatably attached or mounted or secured to the receptacle 10 and/or to the board 50 and also arranged or located in the guide pathway 15 of the receptacle 10.

Another spring biasing member or element 53 is attached or mounted or engaged onto the board 50 and/or the seat 51 and contacted or engaged with the gate 52 for biasing and forcing or moving the gate 52 to contact or engage with the tilted surface 18 and to partially enclose the guide pathway 15 of the receptacle 10 and to form a guide passage 150 above the gate 52 (FIGS. 6, 8) and communicating with the high level surface 17 when the gate 52 is biased and forced to contact or engage with the tilted surface 18 of the receptacle 10, and thus for forming, or defining a substantially oval or elliptical or endless shaped structure or configuration for the guide pathway 15 of the receptacle 10 selectively. The spring biasing member or element 53 is arranged to allow the gate 52 to be opened from the tilted surface 18 toward the high level surface 17 (FIGS. 9-12).

Figure 36:
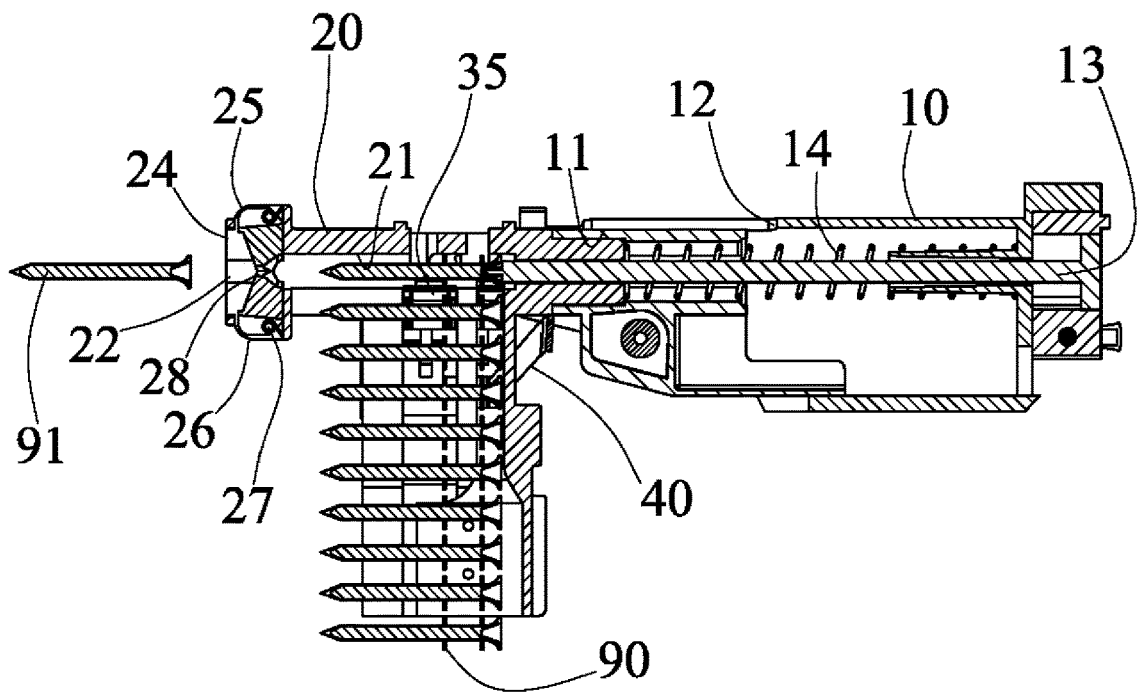
Figure 37:
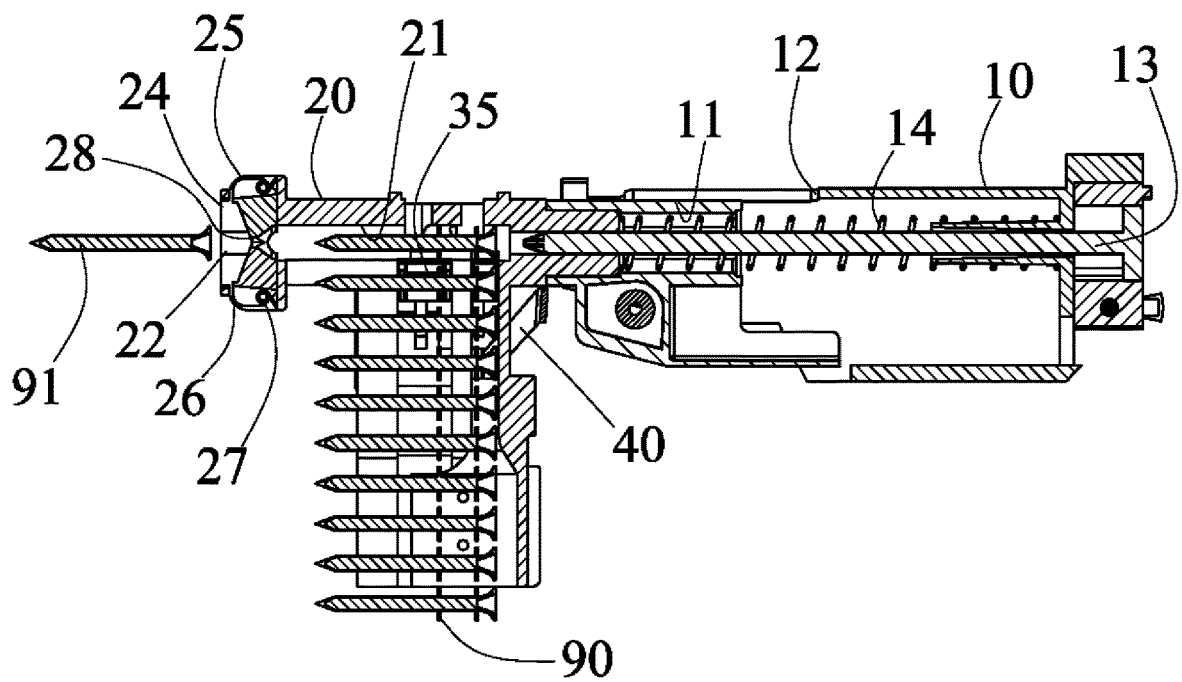

A guide or actuating lever 40 is rotatably attached or mounted or secured to the barrel 20, for example, the actuating lever 40 includes a middle or intermediate portion pivotally or rotatably attached or mounted or secured to the barrel 20 with a pivot axle 41 (FIGS. 5, 18-19 and 25-27) for allowing the actuating lever 40 to be pivoted or rotated relative to the barrel 20, and includes a guide pin 42 attached or mounted or secured to one of the end portions of the actuating lever 40 and slidably received or engaged in the guide pathway 15 of the receptacle 10 selectively (FIGS. 1-3 and 8-17), and includes a guide stud or rod 43 attached or mounted or secured to the other end portion, of the actuating lever 40 and slidably received or engaged in the guide groove 36 of the pusher 35 (FIGS. 5, 18-27), in which the pusher 35 is contacted or engaged with the fastener 91 for moving and feeding the fastener 91 into the bore 21 of the barrel 20 selectively (FIGS. 36-37).

In operation, as shown in FIGS. 8-13, the barrel 20 may be forced to contact or engage with a work piece (not illustrated) and may then be forced to move or engage into the receptacle 10, for allowing the fastener 91 to be driven with the mandrel 13 and to be moved out of the barrel 20 (FIGS. 12-17) and to be engaged into the work piece. At this moment, when the barrel 20 is moved and engaged into the receptacle 10, the guide pin 42 of the actuating lever 40 will be moved from the low level surface 16 (FIGS. 8, 9) to the tilted surface 18 (FIGS. 10, 11) and then to the high level surface 17 (FIGS. 12, 13) of the receptacle 10 by opening the gate 52 that is biased by the spring biasing element 53; i.e., the spring biased gate 52 is arranged to allow the guide pin 42 of the actuating lever 40 to move over the gate 52 (FIGS. 11, 12) from the tilted surface 18 toward the high level surface 17, and when the guide pin 42 is moved over the gate 52, the spring biasing element 53 may bias and force the gate 52 to contact or engage with the tilted surface 18 and to partially enclose the guide pathway 15 of the receptacle 10, and to form the guide passage 150 above the gate 52 (FIGS. 6, 8), and to form as a check valve and to prevent the guide pin 42 from moving backward into the tilted surface 18 again, and to guide and limit the guide pin 42 to move into the guide passage 150 that is formed and located above the gate 52 (FIGS. 13-15), and then to contact or engage with the inclined surface 19 (FIGS. 16, 17) of the receptacle 10.

The guide pin 42 of the actuating lever 40 may be moved forwardly into the guide passage 150 that is formed and located above the gate 52 when the barrel 20 is moved forwardly relative to the receptacle 10 with or by the spring biasing member 14. When the guide pin 42 of the actuating lever 40 is moved through the guide pathway 15 of the receptacle 10, from the low level surface 16 (FIGS. 8, 9) to the tilted surface 18 (FIGS. 10, 11) and then to the high level surface 17 (FIGS. 12, 13) of the receptacle 10, the guide rod 43 of the actuating lever 40 may move the pusher 35 from the upper position (FIGS. 18-19) to the lower position (FIGS. 20, 21), and may maintain the pusher 35 at the lower position (FIGS. 22-26) when the guide pin 42 is moved into the guide passage 150 that is formed and located above the gate 52, and may move the pusher 35 to the upper position again (FIG. 27) when the guide pin 42 is moved and contacted or engaged with the inclined surface 19 of the receptacle 10, in order to move and feed the fastener 91 into the bore 21 of the barrel 20 selectively (FIGS. 36-37).

Accordingly, the staple advance device in accordance with the present invention includes an improved structure or configuration for effectively advancing or feeding or driving collated staples or screws or nails or fasteners which are joined together in a strip or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A staple advance device for driving with a power driver a screwstrip comprising threaded fasteners, such as screws or the like, which are joined together in a strip comprising:

a receptacle including a chamber formed in said receptacle, and including a guide pathway formed in said receptacle and defined by a low level surface, a high level surface, a tilted surface located between said low and said high level surfaces, and an inclined surface formed and located beside said low level surface and communicating with said low level surface;

a barrel slidably engaged in said chamber of said receptacle and engageable into and out of said chamber of said receptacle, said barrel including a longitudinal bore formed in said barrel for slidably receiving and engaging with the fastener;

a mandrel engaged in said chamber of said receptacle and engageable into said bore of said barrel for engaging with the fastener and for driving the fastener to move out of said bore of said barrel selectively;

a spring biasing member engaged in said chamber of said receptacle and engaged with said barrel for biasing and forcing said barrel out of said chamber of said receptacle selectively, and for allowing said barrel to be forced to engage into said chamber of said receptacle selectively;

a guide plate attached to said barrel for supporting said strip and the fasteners and for guiding and limiting the fasteners to move into said bore of said barrel in series;

an actuating lever pivotally attached to said barrel with a pivot axle for allowing said actuating lever to be rotated relative to said barrel, and including a guide pin attached to said actuating lever and slidably engaged in said guide pathway of said receptacle, and including a guide rod attached to said actuating lever for moving and feeding the fastener into said bore of said barrel selectively;

a guide device including a gate pivotally attached to said receptacle; and a spring biasing element engaged with said gate for biasing and moving said gate to contact and engage with said tilted surface selectively, and to form a guide passage above said gate and communicating with said high level surface when said gate is biased and forced to engage with said tilted surface of said receptacle.

2. The staple advance device as claimed in claim 1, wherein said guide plate includes a pusher slidably attached to said guide plate and removable relative to said guide plate, said pusher includes a guide groove formed in said pusher for slidably receiving and engaging with said guide rod.

3. The staple advance device as claimed in claim 1, wherein said guide device includes a board attached to said receptacle, a seat attached to said board and located in said guide pathway of said receptacle, and said spring biasing element is attached to said seat and engaged with said gate for biasing and forcing said gate to contact and engage with said tilted surface of said guide pathway of said receptacle.

4. The staple advance device as claimed in claim 1, wherein said barrel includes an inlet formed in said barrel and communicating with said bore of said barrel, and arranged for allowing the fastener to be engaged into said bore of said barrel.

5. The staple advance device as claimed in claim 1, wherein said barrel includes an outlet formed in said barrel and located in a front portion of said barrel for guiding the fastener to move out of said bore of said barrel.

6. The staple advance device as claimed in claim 5, wherein said barrel includes a guide block pivotally attached to said barrel at said front portion of said barrel, and a second spring biasing element engaged onto said guide block for biasing and forcing said guide block to engage with the fastener and for guiding the fastener to move out of said bore of said barrel.

7. The staple advance device as claimed in claim 6, wherein said guide block includes a guide depression for engaging with the fastener and for guiding and directing the fastener relative to said barrel.

\* \* \* \* \*